US012115805B2

(12) United States Patent
Benninger et al.

(10) Patent No.: US 12,115,805 B2
(45) Date of Patent: Oct. 15, 2024

(54) PROCESSES FOR PRODUCING OPTICAL EFFECT LAYERS COMPRISING ORIENTED NON-SPHERICAL MAGNETIC OR MAGNETIZABLE PIGMENT PARTICLES

(71) Applicant: SICPA HOLDING SA, Prilly (CH)

(72) Inventors: Nathalie Benninger, La Chaux-de-Fonds (CH); Evgeny Loginov, Renens (CH); Claude-Alain Despland, Prilly (CH); Gisèle Baudin, Cugy (CH)

(73) Assignee: SICPA HOLDING SA, Prilly (CH)

( * ) Notice: Subject to any disclaimer, the term of this patent is extended or adjusted under 35 U.S.C. 154(b) by 340 days.

(21) Appl. No.: 17/272,567

(22) PCT Filed: Aug. 5, 2019

(86) PCT No.: PCT/EP2019/070990
§ 371 (c)(1),
(2) Date: Mar. 1, 2021

(87) PCT Pub. No.: WO2020/052862
PCT Pub. Date: Mar. 19, 2020

(65) Prior Publication Data
US 2021/0323335 A1   Oct. 21, 2021

(30) Foreign Application Priority Data

Sep. 10, 2018 (EP) .................................. 18193402

(51) Int. Cl.
*B42D 25/369* (2014.01)
*B41M 3/14* (2006.01)
(Continued)

(52) U.S. Cl.
CPC ............ *B41M 7/0072* (2013.01); *B41M 3/14* (2013.01); *B42D 25/369* (2014.10);
(Continued)

(58) Field of Classification Search
CPC ........ B05D 3/207; B05D 5/06; B42D 25/369; B42D 25/29; B41M 3/14; B41F 19/05
See application file for complete search history.

(56) References Cited

U.S. PATENT DOCUMENTS 2,570,856 A   10/1951  Carlton et al.
3,676,273 A    7/1972  Stuart
(Continued)

FOREIGN PATENT DOCUMENTS

CN       1845215       10/2006
CN     102529326 B      8/2014
(Continued)

OTHER PUBLICATIONS

Japanese Patent Office Action in counterpart Japan Application No. JP 2021-512449 dated Feb. 7, 2023 (and English language translation of Office Action).
(Continued)

*Primary Examiner* — Tabassom Tadayyon Eslami
(74) *Attorney, Agent, or Firm* — MUNCY, GEISSLER, OLDS & LOWE, P.C.

(57) ABSTRACT

The present invention relates to the field of magnetic assemblies and processes for producing optical effect layers (OEL) comprising magnetically oriented non-spherical magnetic or magnetizable pigment particles on a substrate. In particular, the present invention relates magnetic assemblies and processes for producing said OELs as anti-counterfeit means on security documents or security articles or for decorative purposes.

18 Claims, 7 Drawing Sheets

(51) Int. Cl.
*B41M 7/00* (2006.01)
*C09D 11/037* (2014.01)
*C09D 11/101* (2014.01)
*C09D 11/107* (2014.01)

(52) U.S. Cl.
CPC .......... *C09D 11/037* (2013.01); *C09D 11/101* (2013.01); *C09D 11/107* (2013.01)

(56) References Cited

U.S. PATENT DOCUMENTS

| | | | |
|---|---|---|---|
| 3,791,864 | A | 2/1974 | Steingroever |
| 4,838,648 | A | 6/1989 | Phillips et al. |
| 5,364,689 | A | 11/1994 | Kashiwagi et al. |
| 5,630,877 | A | 5/1997 | Kashiwagi et al. |
| 6,410,130 | B1 | 6/2002 | Schuhmacher et al. |
| 6,531,221 | B1 | 3/2003 | Schuhmacher et al. |
| 6,582,781 | B1 | 6/2003 | Schuhmacher et al. |
| 6,838,166 | B2 | 1/2005 | Phillips et al. |
| 8,343,615 | B2 | 1/2013 | Raksha et al. |
| 2006/0219107 | A1 | 10/2006 | Gggi |
| 2007/0172261 | A1 | 7/2007 | Raksha et al. |
| 2011/0017081 | A1 | 1/2011 | Gggi |
| 2012/0205905 | A1* | 8/2012 | Degott ................ B42D 25/369 427/7 |
| 2013/0084411 | A1 | 4/2013 | Raksha et al. |
| 2016/0176223 | A1 | 6/2016 | Degott et al. |
| 2016/0325578 | A1 | 11/2016 | Ritter et al. |
| 2017/0305184 | A1 | 10/2017 | Muller |
| 2018/0111406 | A1 | 4/2018 | Loginov et al. |

FOREIGN PATENT DOCUMENTS

| | | | |
|---|---|---|---|
| EP | 0686675 | B1 | 2/1998 |
| EP | 1666546 | A2 | 6/2006 |
| EP | 1710756 | A1 | 10/2006 |
| EP | 2024451 | * | 9/2009 |
| EP | 2157141 | A1 | 2/2010 |
| EP | 2306222 | A2 | 4/2011 |
| EP | 2325677 | A2 | 5/2011 |
| EP | 2402401 | A1 | 1/2012 |
| JP | 06076284 | | 3/1994 |
| JP | 10-021541 | | 1/1998 |
| JP | 2008-213486 | | 9/2009 |
| TW | 201435003 | | 9/2014 |
| WO | 02/073250 | A2 | 9/2002 |
| WO | 03/000801 | A2 | 1/2003 |
| WO | 2005/002866 | A1 | 1/2005 |
| WO | 2006/063926 | A1 | 6/2006 |
| WO | 2007/131833 | A1 | 11/2007 |
| WO | 2008/046702 | A1 | 4/2008 |
| WO | 2011/092502 | A2 | 8/2011 |
| WO | 2014072172 | | 5/2014 |
| WO | 2014/108303 | A1 | 7/2014 |
| WO | 2014/108404 | A2 | 7/2014 |
| WO | 2015/082344 | A1 | 6/2015 |
| WO | 2015/086257 | A1 | 6/2015 |
| WO | 2016/026896 | A1 | 2/2016 |
| WO | 2017/064052 | A1 | 4/2017 |
| WO | 2017/080698 | * | 5/2017 |
| WO | 2017/080698 | A1 | 5/2017 |
| WO | 2017/148789 | * | 9/2017 |
| WO | 2017/148789 | A1 | 9/2017 |

OTHER PUBLICATIONS

Taiwanese Patent Office Action and Search Report in counterpart Taiwanese Application No. 108126955 dated Jun. 29, 2023 (and English language translation of Office Action).
Benenson et al., Handbook of Physics, Springer 2002, pp. 463-464.
"Chemistry & Technology of UV & EB Formulation for Coatings, Inks & Paints", vol. IV, Formulation, by C. Lowe, G. Webster, S. Kessel and I. McDonald, 1996 by John Wiley & Sons in association with SITA Technology Limited.
"Chemistry & Technology of UV & EB Formulation for Coatings, Inks & Paints", vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.
Z.Q. Zhu et D. Howe "Halbach permanent magnet machines and applications: a review," IEE. Proc. Electric Power Appl., 2001, 148, p. 299-308.
European Search Report in counterpart European Application No. 18193402.7 dated Mar. 21, 2019.
International Search Report and Written Opinion issued with respect to application No. Jan. 2015 PCT/EP2019/070990, Jan. 2015.

* cited by examiner

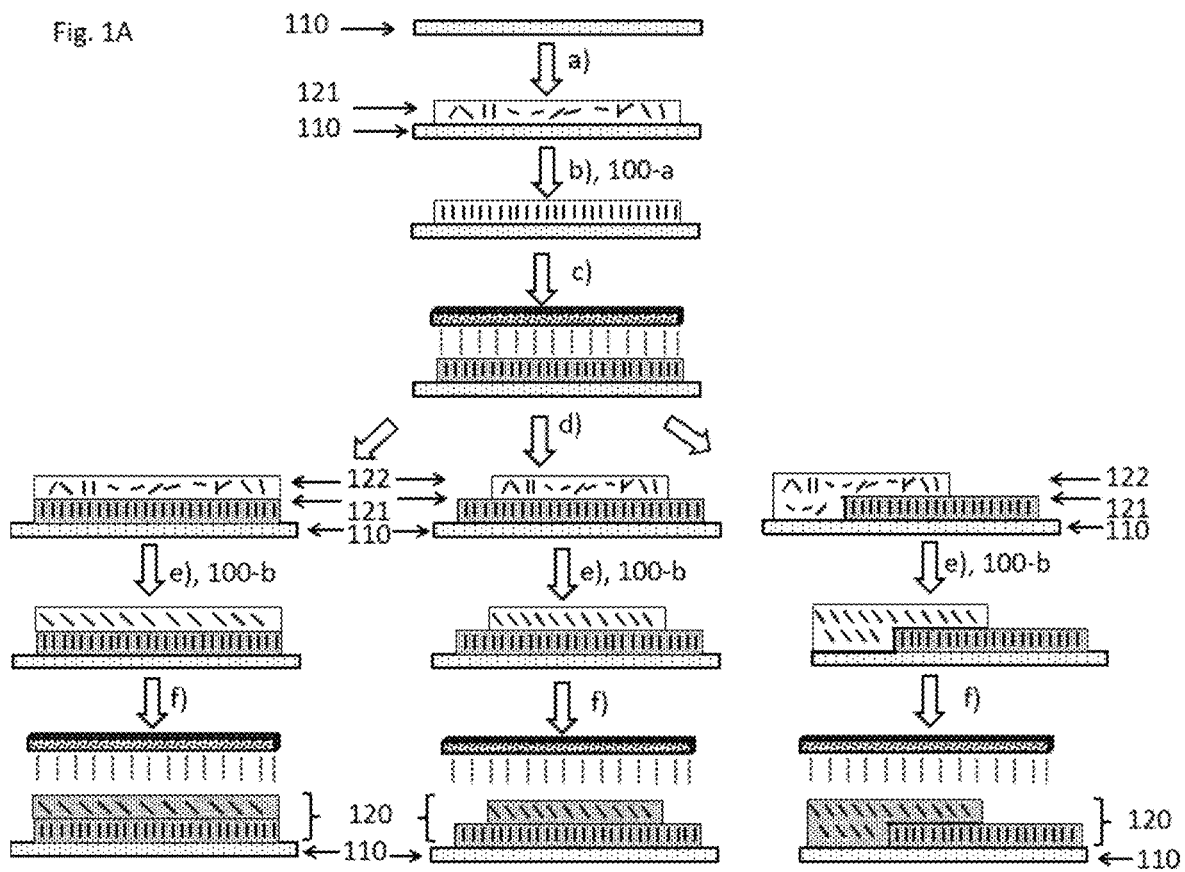

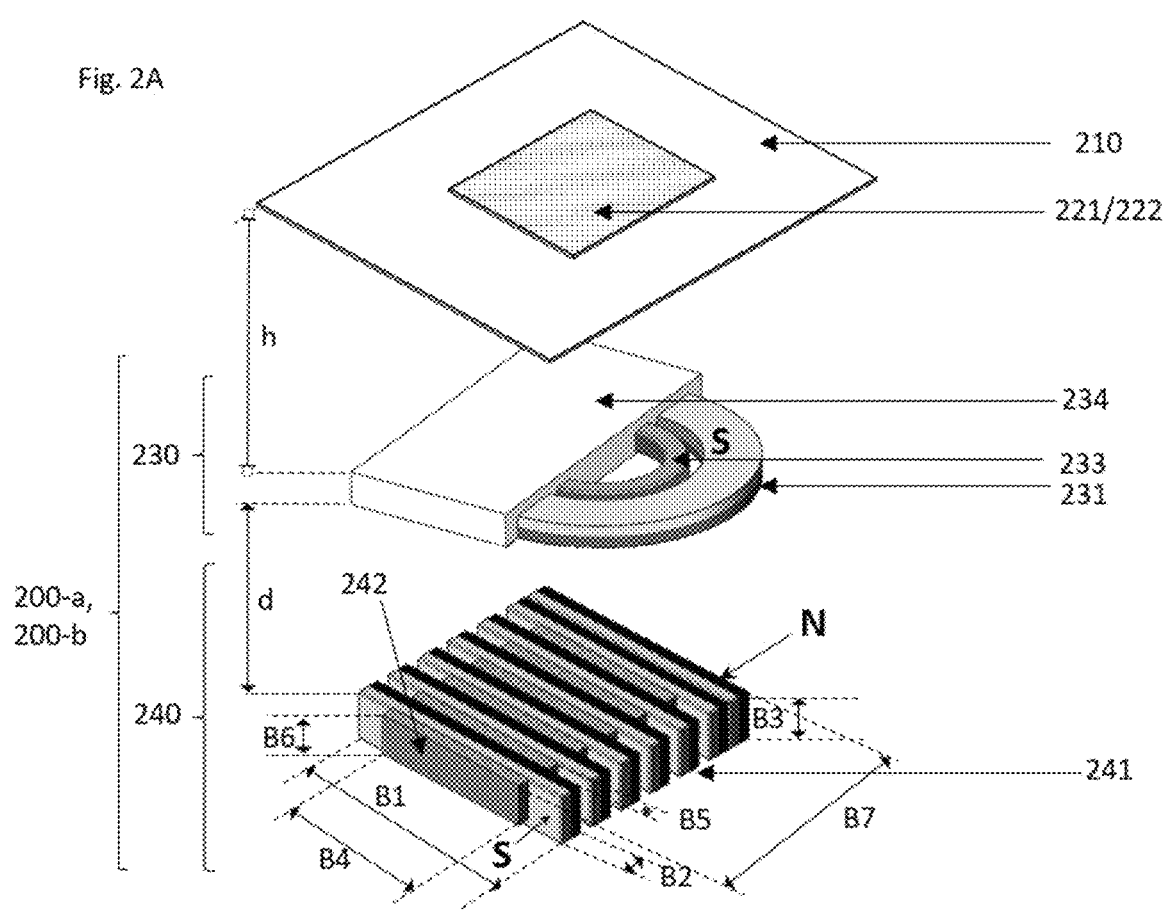
Fig. 2A
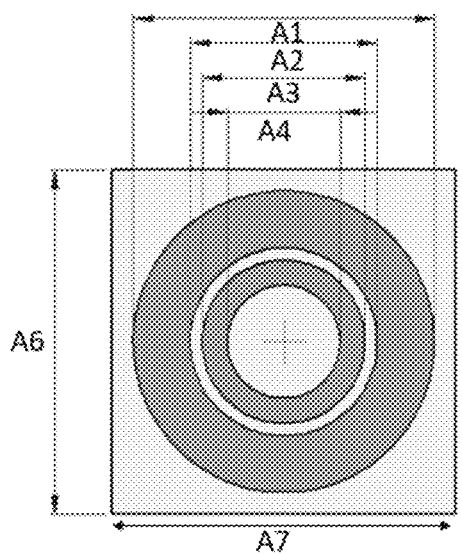
Fig. 2B1
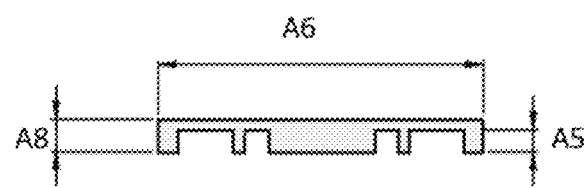
Fig. 2B2

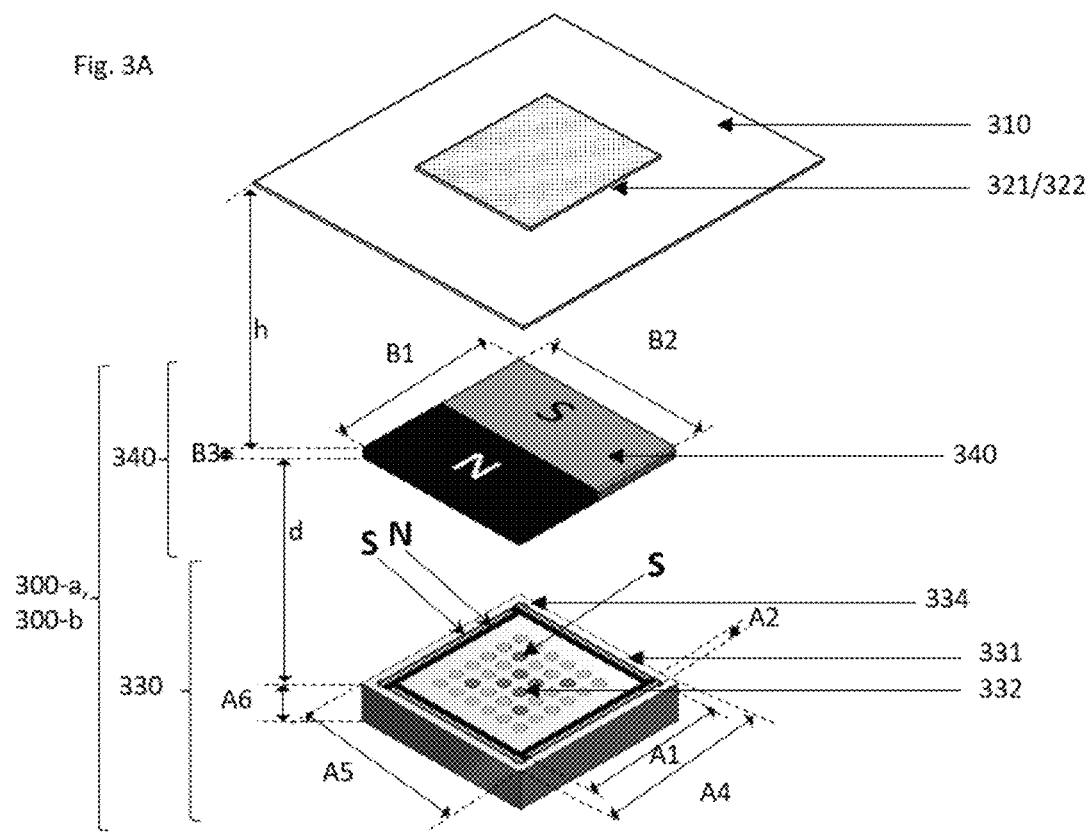
Fig. 3A
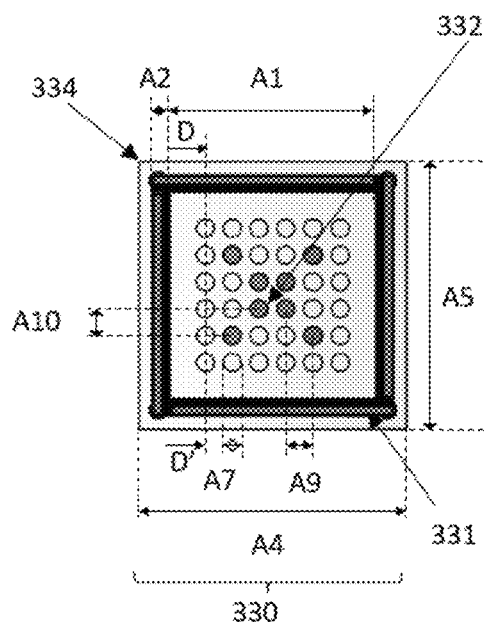
Fig. 3B1
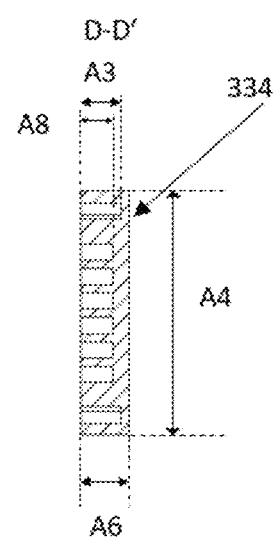
Fig. 3B2

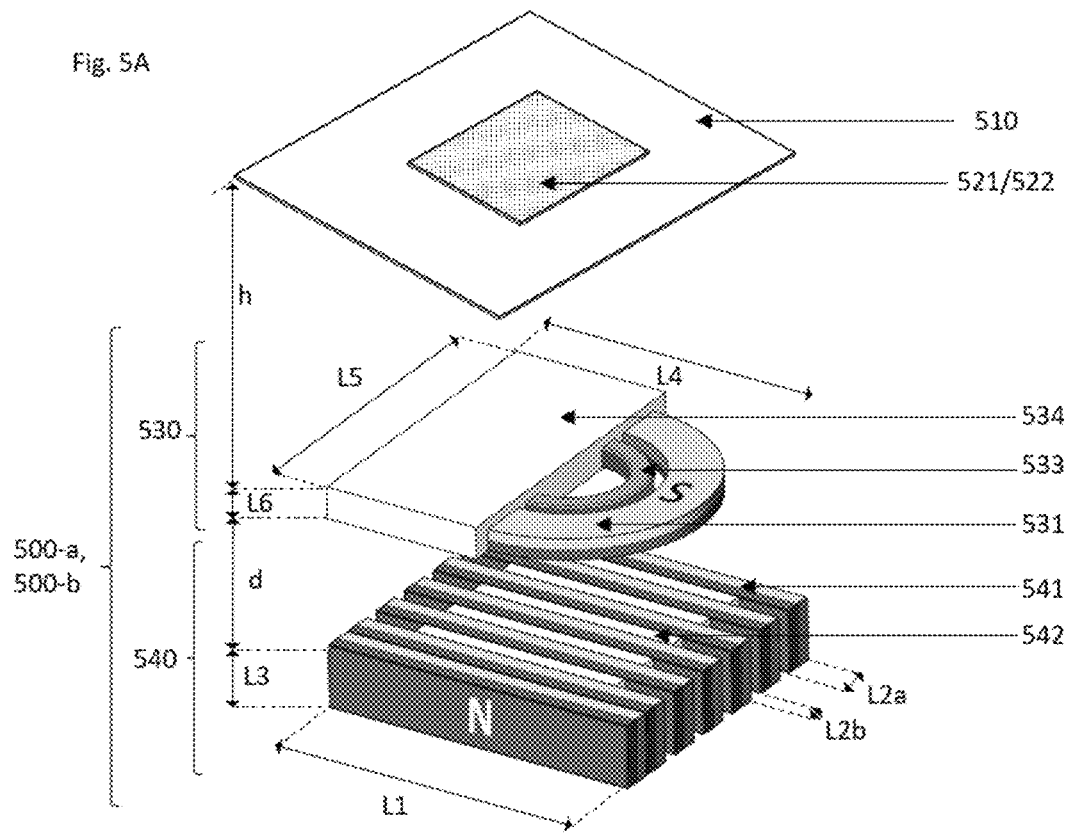
Fig. 5A
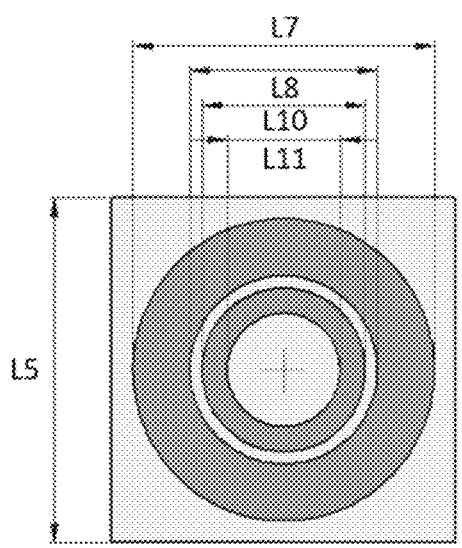
Fig. 5B1
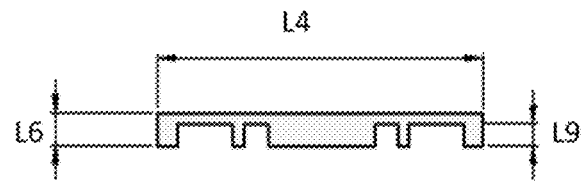
Fig. 5B2

PROCESSES FOR PRODUCING OPTICAL EFFECT LAYERS COMPRISING ORIENTED NON-SPHERICAL MAGNETIC OR MAGNETIZABLE PIGMENT PARTICLES

FIELD OF THE INVENTION

The present invention relates to the field of the protection of value documents and value commercial goods against counterfeit and illegal reproduction. In particular, the present invention relates to optical effect layers (OEL) showing a loop-shaped viewing-angle dependent optical effect, magnetic assemblies and processes for producing said OEL, as well as uses of said optical effect layers as anti-counterfeit means on documents.

BACKGROUND OF THE INVENTION

The use of inks, coating compositions, coatings, or layers, containing magnetic or magnetizable pigment particles, in particular non-spherical optically variable magnetic or magnetizable pigment particles, for the production of security elements and security documents is known in the art.

Security features, e.g. for security documents, can be classified into "covert" and "overt" security features. The protection provided by covert security features relies on the concept that such features are hidden, typically requiring specialized equipment and knowledge for their detection, whereas "overt" security features are easily detectable with the unaided human senses, e.g. such features may be visible and/or detectable via the tactile senses while still being difficult to produce and/or to copy. However, the effectiveness of overt security features depends to a great extent on their easy recognition as a security feature, because users will only then actually perform a security check based on such security feature if they are aware of its existence and nature.

Coatings or layers comprising oriented magnetic or magnetizable pigment particles are disclosed for example in U.S. Pat. Nos. 2,570,856; 3,676,273; 3,791,864; 5,630,877 and 5,364,689. Magnetic or magnetizable pigment particles in coatings allow for the production of magnetically induced images, designs and/or patterns through the application of a corresponding magnetic field, causing a local orientation of the magnetic or magnetizable pigment particles in the unhardened coating, followed by hardening the latter. This results in specific optical effects, i.e. fixed magnetically induced images, designs or patterns which are highly resistant to counterfeit. The security elements based on oriented magnetic or magnetizable pigments particles can only be produced by having access to both the magnetic or magnetizable pigment particles or a corresponding ink or composition comprising said particles, and the particular technology employed to apply said ink or composition and to orient said pigment particles in the applied ink or composition.

Moving-ring effects have been developed as efficient security elements. Moving-ring effects consist of optically illusive images of objects such as funnels, cones, bowls, circles, ellipses, and hemispheres that appear to move in any x-y direction depending upon the angle of tilt of said optical effect layer. Methods for producing moving-ring effects are disclosed for example in EP 1 710 756 A1, U.S. Pat. No. 8,343,615, EP 2 306 222 A1, EP 2 325 677 A2, and US 2013/084411 U.S. Pat. No. 9,257,059.

WO 2011/092502 A2 discloses an apparatus for producing moving-ring images displaying an apparently moving ring with changing viewing angle. The disclosed moving-ring images might be obtained or produced by using a device allowing the orientation of magnetic or magnetizable particles with the help of a magnetic field produced by the combination of a soft magnetizable sheet and a spherical magnet having its North-South axis perpendicular to the plane of the coating layer and disposed below said soft magnetizable sheet.

The prior art moving ring images are generally produced by alignment of the magnetic or magnetizable particles according to the magnetic field of only one rotating or static magnet. Since the field lines of only one magnet generally bend relatively softly, i.e. have a low curvature, also the change in orientation of the magnetic or magnetizable particles is relatively soft over the surface of the OEL. Further, the intensity of the magnetic field decreases rapidly with increasing distance from the magnet when only a single magnet is used. This makes it difficult to obtain a highly dynamic and well-defined feature through orientation of the magnetic or magnetizable particles, and may result in visual effects that exhibit blurred ring edges.

WO 2014/108404 A2 discloses optical effect layers (OEL) comprising a plurality of magnetically oriented non-spherical magnetic or magnetizable particles, which are dispersed in a coating. The specific magnetic orientation pattern of the disclosed OELs provides a viewer the optical effect or impression of a loop-shaped body that moves upon tilting of the OEL. Moreover, WO 2014/108404 A2 discloses OELs further exhibiting an optical effect or impression of a protrusion in the central area of the loop-shaped body, said protrusion being caused by a reflection zone in the central area surrounded by the loop-shaped body. The disclosed protrusion provides the impression of a three-dimensional object, such as a half-sphere, present in the central area surrounded by the loop-shape body.

WO 2014/108303 A1 discloses optical effect layers (OEL) comprising a plurality of magnetically oriented non-spherical magnetic or magnetizable particles, which are dispersed in a coating. The specific magnetic orientation pattern of the disclosed OELs provides a viewer the optical effect or impression of a plurality of nested loop-shaped bodies surrounding one common central area, wherein said bodies exhibit a viewing-angle dependent apparent motion. Moreover, WO 2014/108303 A1 discloses OELs further comprising a protrusion which is surrounded by the innermost loop-shaped body and partly fills the central area defined thereby. The disclosed protrusion provides the illusion of a three-dimensional object, such as a half-sphere, present in the central area.

WO 2017/064052 A1, WO 20170/80698 A1 and WO 2017/148789 A1 disclose magnetic assemblies and processes for producing optical effect layers (OEL) comprising magnetically oriented non-spherical magnetic or magnetizable pigment particles on a substrate, wherein said optical effect layers provide an optical impression of one or more loop-shaped bodies having a size that varies upon tilting the optical effect layer.

A need remains for security features displaying an eye-catching dynamic loop-shaped effect changing its appearance on a substrate in good quality, which can be easily verified regardless of the orientation of the security document, is difficult to produce on a mass-scale with the equipment available to a counterfeiter, and which can be provided in great number of possible shapes and forms.

SUMMARY OF THE INVENTION

Accordingly, it is an object of the present invention to overcome the deficiencies of the prior art as discussed above.

In a first aspect, the present invention provides a process for producing an optical effect layer (OEL) (x20) on a substrate (x10) and optical effect layers (OEL) obtained thereof, said process comprising the steps of:

a) applying on a substrate (x10) surface a first radiation curable coating composition comprising non-spherical magnetic or magnetizable pigment particles so as to form one or more first patterns of a first coating layer (x21), said first radiation curable coating composition being in a first state, b) exposing the first radiation curable coating composition to a magnetic field of a first magnetic assembly (x00-*a*) comprising i) a magnetic-field generating device (x30) comprising a loop-shaped magnetic-field generating device (x31) being either a single loop-shaped dipole magnet having a magnetic axis substantially perpendicular to the substrate (x10) surface or a combination of two or more dipole magnets disposed in a loop-shaped arrangement and having a resulting magnetic axis substantially perpendicular to the substrate (x10) surface, optionally one or more pole pieces (x33) and/or optionally a supporting matrix (x34), and ii) a magnetic-field generating device (x40) being either a single bar dipole magnet having a magnetic axis substantially parallel to the substrate (x10) surface or a combination of two or more bar dipole magnets (x41) having a resulting magnetic axis substantially parallel to the substrate (x10) surface; or to a magnetic field of a first magnetic assembly (x00-*a*) comprising i) a magnetic-field generating device (x30) comprising a supporting matrix (x34), a loop-shaped magnetic-field generating device (x31) being either a single loop-shaped dipole magnet having a magnetic axis substantially perpendicular to the substrate (x10) surface or a combination of two or more dipole magnets disposed in a loop-shaped arrangement, each of the two or more dipole magnets having a magnetic axis substantially perpendicular to the substrate (x10) surface and having a same magnetic field direction, a single dipole magnet (x32) having a magnetic axis substantially perpendicular to the substrate (x10) surface or two or more dipole magnets (x32) having a magnetic axis substantially perpendicular to the substrate (x10) surface and having a same magnetic field direction and/or one or more pole pieces (x33), and ii) a magnetic-field generating device (x40) being either a single bar dipole magnet having a magnetic axis substantially parallel to the substrate (x10) surface or a combination of two or more bar dipole magnets (x41), each of the two or more bar dipole magnets (x41) having a magnetic axis substantially parallel to the substrate (x10) surface and having a same magnetic field direction; or to a magnetic field of a first magnetic assembly (x00-*a*) comprising i) a magnetic-field generating device (x30) comprising a supporting matrix (x34), a loop-shaped magnetic-field generating device (x31) being either a single loop-shaped magnet or a combination of two or more dipole magnets disposed in a loop-shaped arrangement, the loop-shaped magnetic-field generating device (x31) having a radial magnetization, a single dipole magnet (x32) having a magnetic axis substantially perpendicular to the substrate (x10) surface, or a single dipole magnet (x32) having a magnetic axis substantially parallel to the substrate (x10) surface, or two or more dipole magnets (x32), each of said two or more dipole magnets (x32) having a magnetic axis substantially perpendicular to the substrate (x10) surface, wherein the North pole of said single dipole magnet (x32) or the North pole of at least one of said two or more dipole magnets (x32) is pointing towards the substrate (x10) surface when the North pole of the single loop-shaped magnet or of the two or more dipole magnets forming the loop-shaped magnetic-field generating device (x31) is pointing towards the periphery of said loop-shaped magnetic-field generating device (x31), or wherein the South pole of said single dipole magnet (x32) or the South pole of at least one of said two or more dipole magnets (x32) is pointing towards the substrate (x10) surface when the South pole of the single loop-shaped magnet or of the two or more dipole magnets forming the loop-shaped magnetic-field generating device (x31) is pointing towards the periphery of said loop-shaped magnetic-field generating device (x31), and ii) a magnetic-field generating device (x40) being either a single bar dipole magnet having a magnetic axis substantially parallel to the substrate (x10) surface or a combination of two or more bar dipole magnets (x41), each of the two or more bar dipole magnets (x41) having a magnetic axis substantially parallel to the substrate (x10) surface and having a same magnetic field direction, so as to orient at least a part of the non-spherical magnetic or magnetizable pigment particles, and c) at least partially curing the first radiation curable coating composition of step b) to a second state so as to fix the non-spherical magnetic or magnetizable pigment particles in their adopted positions and orientations and so as to form one or more at least partially cured first patterns, d) applying at least partially on the one or more at least partially cured first patterns of step c) a second radiation curable coating composition comprising non-spherical magnetic or magnetizable pigment particles so as to form one or more second patterns of a second coating layer (x22), said second radiation curable coating composition being in a first state, e) exposing the second radiation curable coating composition to a magnetic field of a second magnetic assembly (x00-*b*), said second magnetic assembly (x00-*b*) being selected from the first magnetic assembly (x00-*a*) of step b), wherein said second magnetic assembly (x00-*b*) is different from the first magnetic assembly (x00-*a*) used in step b) and wherein the magnetic direction of the magnetic-field generating device (x40) of said magnetic assembly (x00-*b*) is opposite to the magnetic direction of the magnetic-field generating device (x40) of the first magnetic assembly (x00-*a*) within the reference frame of the substrate (x10); and f) at least partially curing the second radiation curable coating composition of step e) to a second state so as to fix the non-spherical magnetic or magnetizable pigment particles in their adopted positions and orientations and so as to form one or more at least partially cured second patterns, wherein the optical effect layer provides an optical impression of a loop-shaped body having a size and a shape, that varies upon tilting the optical effect layer wherein the optical effect layer provides an optical impression of a loop-shaped body having a size and shape that varies upon tilting the optical effect layer.

In a further aspect, the present invention provides optical effect layers (OEL) (x20) prepared by the process recited above.

In a further aspect, a use of the optical effect layer (OEL) (x20) is provided for the protection of a security document against counterfeiting or fraud or for a decorative application.

In a further aspect, the present invention provides a security document or a decorative element or object comprising one or more optical effect layer such as those described herein.

BRIEF DESCRIPTION OF DRAWINGS

FIG. 1A illustrates examples of a process suitable for producing optical effect layers (OELs) (120) comprising non-spherical magnetic or magnetizable pigment particles on a substrate (110) according to the present invention. The process comprises the steps of a) applying on the substrate (110) surface the first radiation curable coating composition comprising non-spherical magnetic or magnetizable pigment particles so as to form a first pattern of a first coating layer (121), b) exposing the first radiation curable coating composition to the magnetic field of the first magnetic assembly (100-a) so as to orient at least a part of the non-spherical magnetic or magnetizable pigment particles, c) at least partially curing the first radiation curable coating composition of step b) to a second state so as to fix the non-spherical magnetic or magnetizable pigment particles in their adopted positions and orientations and so as to form an at least partially cured first pattern, d), applying at least partially on the at least partially cured first pattern of step c) the second radiation curable coating composition comprising non-spherical magnetic or magnetizable pigment particles so as to form a second pattern of the second coating layer (122), e) exposing the second radiation curable coating composition to the magnetic field of the second magnetic assembly (100-b), and f) at least partially curing the second radiation curable coating composition of step d) to a second state so as to fix the non-spherical magnetic or magnetizable pigment particles in their adopted positions and orientations and so as to form the at least partially cured second pattern. FIG. 1A (left) schematically illustrates a process wherein the first coating layer (121) has the same size as the second coating layer (122) and wherein the second coating layer (122) fully covers the first coating layer (121), i.e. the second coating layer (122) fully superimposes the first coating layer (121). FIG. 1A (middle) and 1A (right) schematically illustrate processes wherein the first coating layer (121) has a different size than the second coating layer (122), in particular the second coating layer (122) has a smaller size than the first coating layer (121), and wherein the second coating layer (122) partially covers the first coating layer (121), i.e. the second coating layer (122) partially superimposes the first coating layer (121).

FIG. 1B schematically illustrates a process wherein the first coating layer (121) has a different size than the second coating layer (122) and wherein the second coating layer (122) partially covers the first coating layer (121).

FIGS. 2A, 2B1, 2B2, 3A, 3B1, 3B2, 4A, 4B1, 4B2, 5A, 5B1, and 5B2 schematically illustrate first/second magnetic assemblies (x00-a, x100-b) suitable for the process according to the present invention, wherein said process uses two of said magnetic assemblies, one being used during step b) with the first magnetic assembly (x00-a) so as to orient at least a part of the non-spherical magnetic or magnetizable pigment particles of the one or more first patterns of the first coating layer (x21) and the other being used during step e) with the second magnetic assembly (x00-b) so as to orient at least a part of the non-spherical magnetic or magnetizable pigment particles of the one or more second patterns of the second coating layer (x22), wherein the second magnetic assembly (x00-b) is different from the first magnetic assembly (x00-a) and wherein the magnetic direction of the magnetic-field generating device (x40) of said magnetic assembly (x00-b) is opposite to the magnetic direction of the magnetic-field generating device (x40) of the first magnetic assembly (x00-a) within the reference frame of the substrate (x10).

FIG. 2A schematically illustrates a first/second magnetic assembly (200-a, 200-b) comprising i) a magnetic-field generating device (230) comprising a supporting matrix (234), a loop-shaped magnetic-field generating device (231), in particular a ring-shaped dipole magnet, having a magnetic axis substantially perpendicular to the substrate (210) surface and a loop-shaped pole piece (233), in particular a ring-shaped pole piece (233); and ii) a magnetic-field generating device (240) comprising two or more, in particular seven dipole magnets (241) having a magnetic axis substantially parallel to the substrate (210) surface and six spacers (242).

FIG. 2B1 schematically illustrates a bottom view of the magnetic-field generating device (230) of FIG. 2A.

FIG. 2B2 schematically illustrates a cross section of the supporting matrix (234) of FIG. 2A.

FIG. 3A schematically illustrates a first/second magnetic assembly (300-a, 300-b) comprising i) a magnetic-field generating device (330) comprising a supporting matrix (334), a loop-shaped magnetic-field generating device (331), in particular a combination of four dipole magnets disposed in a loop-shaped, in particular a square-shaped, arrangement having a radial magnetization, and two or more dipole magnets (332), in particular eight dipole magnets, each having a magnetic axis substantially perpendicular to the substrate (310) surface; i) a magnetic-field generating device (340), in particular a single bar dipole magnet, having a magnetic axis substantially parallel to the substrate (310) surface.

FIG. 3B1 schematically illustrates a top view of the magnetic-field generating device (330) of FIG. 3A.

FIG. 3B2 schematically illustrates a cross-section along the line (D-D') of the supporting matrix (334) of FIG. 3A.

FIG. 4A schematically illustrates a first/second magnetic assembly (400-a, 400-b) comprising i) a magnetic-field generating device (430), said magnetic assembly comprising a supporting matrix (434), a loop-shaped magnetic-field generating device (431), in particular a combination of four dipole magnets disposed in a loop-shaped, in particular a square-shaped, arrangement having a radial magnetization, and two or more dipole magnets (432), in particular nineteen dipole magnets, each having a magnetic axis substantially perpendicular to the substrate (410) surface; b) a magnetic-field generating device (440), in particular a single bar dipole magnet, having a magnetic axis substantially parallel to the substrate (410) surface; and c) one or more pole pieces (450), in particular one disc-shaped pole piece (450).

FIG. 4B1 schematically illustrates a top view of the magnetic-field generating device (430) of FIG. 4A.

FIG. 4B2 schematically illustrates a cross-section along the line (D-D') of the supporting matrix (434) of FIG. 4A.

FIG. 5A schematically illustrates a first/second magnetic assembly (500-a, 500-b) comprising i) a magnetic-field generating device (530) comprising a supporting matrix (534), a loop-shaped magnetic-field generating device (531), in particular a ring-shaped dipole magnet, having a magnetic axis substantially perpendicular to the substrate (510) surface and a loop-shaped pole piece (533), in particular a ring-shaped pole piece (533); and i) a magnetic-field generating device (540) comprising two or more, in particular seven, dipole magnets (541) having a magnetic axis substantially parallel to the substrate (510) surface and six spacers (542).

FIG. 5B1 schematically illustrates a bottom view of the magnetic-field generating device (530) of FIG. 5A.

FIG. 5B2 schematically illustrates a cross section of the supporting matrix (534) of FIG. 5A.

FIG. 6A show pictures of OEL's (620) as viewed under different viewing angles and obtained by the process using the first magnetic assembly (200-a) depicted in FIG. 2A-B2 and the second magnetic assembly (300-b) depicted in FIG. 3A-B2. FIGS. 6B and 6C show pictures of OEL's (620) as viewed under different viewing angles and obtained by the process using the first magnetic assembly (200-a) depicted in FIG. 2A-B2 and the second magnetic assembly (400-b) depicted in FIG. 4A-B2.

DETAILED DESCRIPTION

Definitions

Figure 1B:
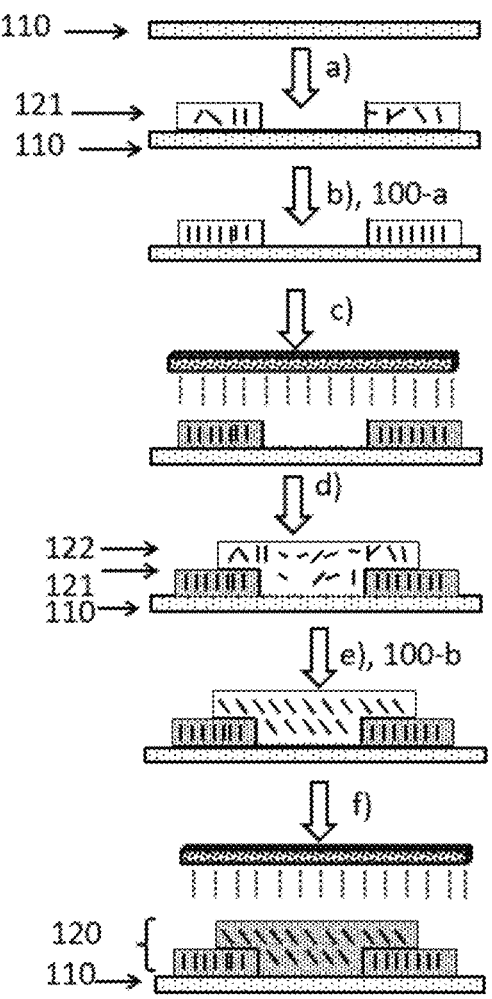
FIG. 1B illustrates an example of a process suitable for producing optical effect layers (OELs) (120) comprising non-spherical magnetic or magnetizable pigment particles on a substrate (110) according to the present invention. The process comprises the steps of a) applying on the substrate (110) surface the first radiation curable coating composition comprising non-spherical magnetic or magnetizable pigment particles so as to form two first patterns, in particular two spaced apart first patterns, of a first coating layer (121), b) exposing the first radiation curable coating composition to the magnetic field of the first magnetic assembly (100-a) so as to orient at least a part of the non-spherical magnetic or magnetizable pigment particles, c) at least partially curing the first radiation curable coating composition of step b) to a second state so as to fix the non-spherical magnetic or magnetizable pigment particles in their adopted positions and orientations and so as to form two at least partially cured first patterns, d), applying at least partially on the two at least partially cured first patterns of step c) the second radiation curable coating composition comprising non-spherical magnetic or magnetizable pigment particles so as to form a second pattern of the second coating layer (122), e) exposing the second radiation curable coating composition to the magnetic field of the second magnetic assembly (100-b), and f) at least partially curing the first radiation curable coating composition of step b) to a second state so as to fix the non-spherical magnetic or magnetizable pigment particles in their adopted positions and orientations and so as to form the at least partially cured second pattern.

The following definitions are to be used to interpret the meaning of the terms discussed in the description and recited in the claims.

As used herein, the indefinite article "a" indicates one as well as more than one and does not necessarily limit its referent noun to the singular.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Generally, when the term "about" is used, it can be expected that similar results or effects according to the invention can be obtained within a range of ±5% of the indicated value.

The term "substantially parallel" refers to deviating not more than 10° from parallel alignment and the term "substantially perpendicular" refers to deviating not more than 10° from perpendicular alignment.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance a fountain solution comprising a compound A may include other compounds besides A. However, the term "comprising" also covers, as a particular embodiment thereof, the more restrictive meanings of "consisting essentially of" and "consisting of", so that for instance "a fountain solution comprising A, B and optionally C" may also (essentially) consist of A and B, or (essentially) consist of A, B and C.

The term "coating composition" refers to any composition which is capable of forming an optical effect layer (OEL) of the present invention on a solid substrate and which can be applied preferentially but not exclusively by a printing method. The coating composition comprises at least a plurality of non-spherical magnetic or magnetizable particles and a binder.

The term "optical effect layer (OEL)" as used herein denotes a combination of two layers that comprise at least a plurality of magnetically oriented non-spherical magnetic or magnetizable particles and a binder, wherein the orientation of the non-spherical magnetic or magnetizable particles is fixed or frozen (fixed/frozen) within the binder.

The term "magnetic axis" denotes a theoretical line connecting the corresponding North and South poles of a magnet and extending through said poles. This term does not include any specific magnetic field direction.

The term "magnetic field direction" denotes the direction of the magnetic field vector along a magnetic field line pointing from the North pole at the exterior of a magnet to the South pole (see Handbook of Physics, Springer 2002, pages 463-464).

The term "curing" is used to denote a process wherein an increased viscosity of a coating composition in reaction to a stimulus to convert a material into a state, i.e. a hardened or solid state, where the non-spherical magnetic or magnetizable pigment particles are fixed/frozen in their current positions and orientations and can no longer move nor rotate.

Where the present description refers to "preferred" embodiments/features, combinations of these "preferred" embodiments/features shall also be deemed as disclosed as long as this combination of "preferred" embodiments/features is technically meaningful.

As used herein, the term "at least" is meant to define one or more than one, for example one or two or three.

The term "security document" refers to a document which is usually protected against counterfeit or fraud by at least one security feature. Examples of security documents include without limitation value documents and value commercial goods.

The term "security feature" is used to denote an image, pattern or graphic element that can be used for authentication purposes.

The term "loop-shaped body" denotes that the non-spherical magnetic or magnetizable particles are provided such that the OEL confers to the viewer the visual impression of a closed body re-combining with itself, forming a closed loop-shaped body surrounding one central dark area. The "loop-shaped body" can have round, oval, ellipsoid, square, triangular, rectangular or any polygonal shape. Examples of loop-shapes include a ring or circle, a rectangle or square (with or without rounded corners), a triangle (with or without rounded corners), a (regular or irregular) pentagon (with or without rounded corners), a (regular or irregular) hexagon (with or without rounded corners), a (regular or irregular) heptagon (with or without rounded corners), an (regular or irregular) octagon (with or without rounded corners), any polygonal shape (with or without rounded corners), etc. In the present invention, the optical impression of a loop-shaped body is formed by the orientation of the non-spherical magnetic or magnetizable particles.

The present invention provides processes for producing optical effect layers (OEL) (x20) on substrates (x10) and optical effect layers (OELs) (x20) obtained thereof, wherein the so-obtained optical effect layers (OELs) (x20) provide a viewer the optical impression of a loop-shaped body having a size and a shape that vary upon tilting the substrate comprising the optical effect layers.

Figure 6:
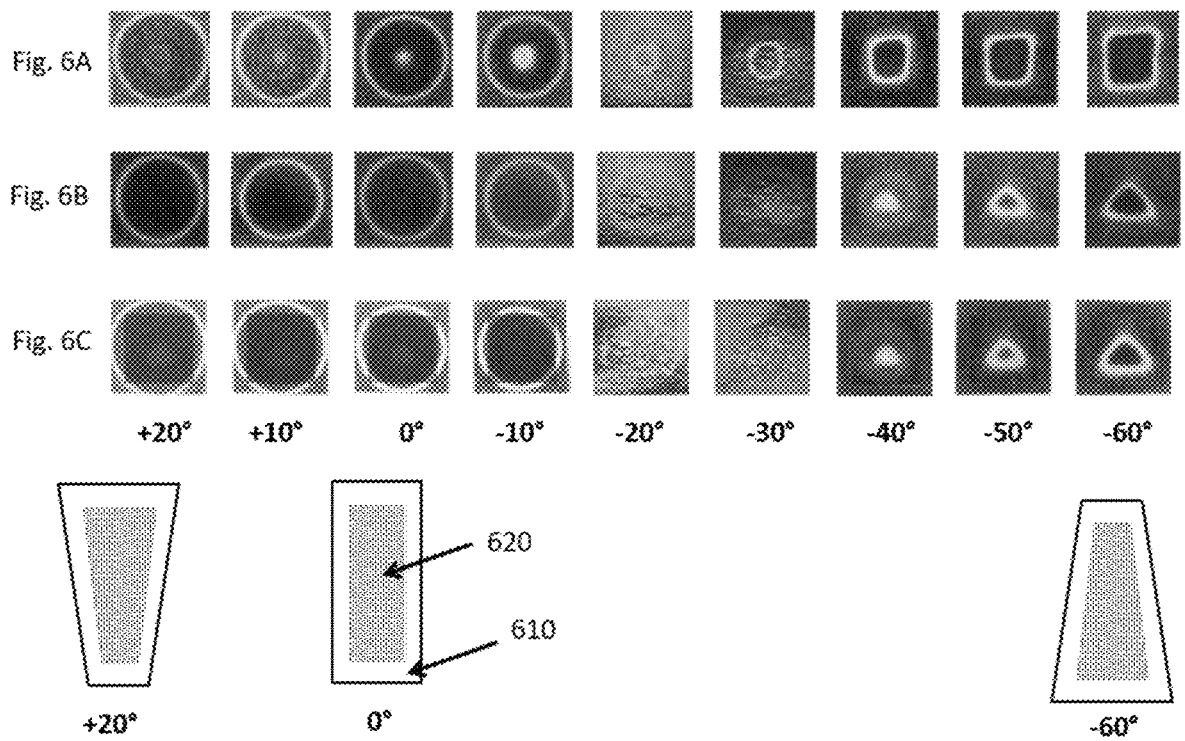
FIG. 6A-C show pictures of OEL's (620) as viewed under different viewing angles and obtained by the process according to the present invention, wherein said process uses in sequence two different first or second magnetic assemblies (x00-a, x00-b) depicted in FIG. 2-4.

The magnetic field produced by the magnetic-field generating device (x30) and the magnetic field produced by the magnetic field generating device (x40) of the first and second magnetic assemblies (x00-a, x00-b), respectively, interact so that the resulting magnetic field of the magnetic assembly is able to orient non-spherical magnetic or magnetizable pigment particles in a not yet cured radiation curable coating composition, which is disposed in the magnetic field of the magnetic assembly to produce an optical impression of the optical effect layer of a loop-shaped body having a size that varies upon tilting the optical effect layer. The combination of the two coating layer (x21, x22) of the so-obtained OEL (x20), each having an optical impression of a different (e.g. one is a circle and the other is a square) loop-shaped body having a size that varies upon tilting the optical effect layer on a substrate (x10) advantageously provides the final optical impression of the OEL exhibiting a loop-shaped body having a size and shape that varies upon tilting the optical effect layer. On the one hand, the optical impression of the so-obtained OELs is such that a first loop-shaped body having a first shape is perceived as reducing its size upon tilting the substrate in a first direction, while a second loop-shaped having a second shape is perceived as increasing its size upon tilting in the same first direction, and vice versa when tilting the substrate in the opposite direction. The perception of the combined effect is such that the first loop-shaped body is perceived as morphing into the second loop-shaped body (and vice versa) upon tilting the substrate in the first direction (respectively, in the opposite direction). The optical impression of the so-obtained OELs is such that when the substrate is tilted in one direction from a perpendicular viewing angle, the loop-shaped body having a first shape reducing its size to another second shape enlarging its size or the loop-shaped body having a first shape increasing its size to another second shape reducing its size. FIG. 6A-C provides examples of OELs obtained according to the process of the invention and exhibiting the optical impression of a loop-shaped body having a size and shape that varies upon tilting the optical effect layer as described hereabove.

The optical effect layer (OEL) (x20) described herein is formed by at least the at least partially cured first coating layer (x21) and the at least partially cured second coating layer (x22), wherein the at least partially cured second coating layer (x22) is at least partially present on top of the at least partially cured first coating layer (x21). The first coating layer (x21) have the shape of one or more first patterns and the second coating layer (x22) have the shape of one or more second patterns. The at least partially cured first coating layer (x21) has the same shape as the shape of the one or more first patterns of the first coating layer (x21) and the at least partially cured second coating layer (x22) has the same shape as the shape of the one or more second patterns of the second coating layer (x22).

The shape of the one or more first patterns of the first coating layer (x21) may be the same as the shape of the one or more second patterns of the second coating layer (x22) or may be different. The one or more first patterns of the first coating layer (x21) and the one or more second patterns of the second coating layer (x22) described herein may independently be continuous or discontinuous. Preferably, the shape of the one or more first patterns of the first coating layer (x21) and the shape of the one or more second patterns of the second coating layer (x22) independently represent one or more indicia, dots and/or lines. As used herein, the term "indicia" shall mean designs and patterns, including without limitation symbols, alphanumeric symbols, motifs, letters, words, numbers, logos and drawings. When more than one first patterns of the first coating layer (x21) and more than one second patterns of the second coating layer (x22) are present on the substrate (x10) described herein, said more than one first/second patterns may independently consist of lines, dots and/or indicia being spaced apart from each other by a free first coating layer (x21) area, a free second coating layer (x22) area, respectively.

As shown in FIG. 1A-B, the size of the first coating layer (x21) and the size of the one or more first patterns of said first coating layer (x21) may be the same as the size of the second coating layer (x22) and the size of the one or more second patterns of said second coating layer (x22) or may be different.

As shown in FIG. 1A-B, the second coating layer (x22) is present on top of the first coating layer (x21), wherein said second coating layer (x22) may be fully covering the first coating layer (x21) (see FIG. 1A-left) or may be partially covering the first coating layer (x21) (see FIG. 1A—middle and right and FIG. 1B).

As shown for example in FIG. 1A-B, the present invention provides methods and processes for producing the optical effect layer (OEL) (x20) described herein on the substrate (x10) described herein and optical effect layers (OELs) (x20) obtained thereof, wherein said methods and processes comprise two independent steps (i.e. steps a) and d)) of applying a radiation curable coating composition comprising non-spherical magnetic or magnetizable pigment particles, said radiation curable coating composition being in a first state, two independent steps (i.e. steps b) and e)) of exposing the radiation curable coating composition to the magnetic field of the magnetic assemblies (100-a, 100-b) so as to orient at least a part of the non-spherical magnetic or magnetizable pigment particles, and two independent steps (i.e. steps c) and f)) of at least partially curing the radiation curable coating compositions to a second state so as to fix the non-spherical magnetic or magnetizable pigment particles in their adopted positions and orientations.

The processes described herein may be carried out in two passes on an apparatus comprising a) an application unit, preferably a printing unit, b) a magnetic orientation unit and c) a curing unit, wherein the magnetic orientation unit comprises during the first pass the first magnetic assembly (x00-$a$) and comprises during the second pass the second magnetic assembly (x00-$b$). Alternatively, the process described herein may be carried out in a single pass on an apparatus comprising a) a first application unit, preferably a first printing unit, b) a first magnetic orientation unit comprising the first magnetic assembly (x00-$a$), c) a first curing unit, d) a second application unit, preferably a second printing unit, e) a second magnetic orientation unit comprising the second magnetic assembly (x00-$b$), and f) a second curing unit. The magnetic orientation units described herein may consist of a rotating magnetic cylinder comprising one or more first/second magnetic assemblies (x00-$a$, x00-$b$) described herein, wherein said one or more first/second magnetic assemblies (x00-$a$, x00-$b$) described herein are mounted to circumferential grooves of the rotating magnetic cylinder or may consist of a flatbed printing unit comprising one or more first/second magnetic assemblies (x00-$a$, x00-$b$) described herein, wherein said one or more first/second magnetic assemblies (x00-$a$, x00-$b$) described herein are mounted to recesses of the flatbed printing unit. The rotating magnetic cylinder described herein is meant to be used in, or in conjunction with, or being part of an application unit such as a printing or coating unit. The rotating magnetic cylinder may be part of a rotary, sheet-fed or web-fed industrial printing press that operates at high printing speed in a continuous way. The flatbed printing unit may be part of a sheet-fed industrial printing press that operates in a discontinuous way.

The process described herein comprises a step a) and a step d) of applying the radiation curable coating composition described herein comprising non-spherical magnetic or magnetizable pigment particles, said radiation curable coating composition being in a first state. The step a) of applying on the substrate (x10) surface the first radiation curable coating composition comprising non-spherical magnetic or magnetizable pigment particles described herein so as to form the one or more first patterns described herein of the first coating layer (x21) described herein and/or the step d) of applying on the substrate (x10) surface the second radiation curable coating composition comprising non-spherical magnetic or magnetizable pigment particles described herein so as to form the one or more second patterns of the second coating layer (x22) described herein are preferably independently carried out by a printing process preferably selected from the group consisting of screen printing, rotogravure printing, flexography printing, inkjet printing and intaglio printing (also referred in the art as engraved copper plate printing and engraved steel die printing), more preferably selected from the group consisting of screen printing, rotogravure printing and flexography printing.

Subsequently to, partially simultaneously with or simultaneously with the application of the first radiation curable coating composition described herein (step a)) and the second radiation curable coating composition (step d)) described herein, respectively, on the substrate (x10) surface described herein or at least partially on the one or more at least partially cured first patterns, respectively, at least a part of the non-spherical magnetic or magnetizable pigment particles independently are oriented by exposing the radiation curable coating composition, the first and second radiation curable coating compositions respectively, to the magnetic field of a first magnetic assembly (x00-$a$) and to the magnetic field of the second magnetic assembly (x00-$b$), respectively, so as to align at least part of the non-spherical magnetic or magnetizable pigment particles along the magnetic field lines generated by the respective magnetic assembly.

Subsequently to or partially simultaneously with the steps of orienting/aligning at least a part of the non-spherical magnetic or magnetizable pigment particles by applying the magnetic field described herein (step b) and step e)), the orientation of the non-spherical magnetic or magnetizable pigment particles is fixed or frozen. The first and second radiation curable coating compositions must thus noteworthy have a first state, i.e. a liquid or pasty state, wherein the radiation curable coating compositions are wet or soft enough, so that the non-spherical magnetic or magnetizable pigment particles dispersed in the radiation curable coating compositions are freely movable, rotatable and/or orientable upon exposure to the magnetic field, and a second cured (e.g. solid) state, wherein the non-spherical magnetic or magnetizable pigment particles are fixed or frozen in their respective positions and orientations.

Accordingly, the processes for producing the optical effect layer (OEL) (x20) described herein on the substrate (x10) described herein independently comprise a step c) and a step f) of at least partially curing the first radiation curable coating composition of step a) and the second radiation curable coating composition of step d) to a second state so as to fix the non-spherical magnetic or magnetizable pigment particles in their adopted positions and orientations. The step of at least partially curing the first and second radiation curable coating compositions (steps a) and d)) may be independently carried out subsequently to or partially simultaneously with the step of orienting/aligning at least a part of the non-spherical magnetic or magnetizable pigment particles by applying the magnetic field described herein (step b) and step e)). Preferably, the step of at least partially curing the first radiation curable coating composition to a second state so as to fix the non-spherical magnetic or magnetizable pigment particles in their adopted positions and orientations and so as to form one or more at least partially cured first patterns (step c)) is carried out partially simultaneously with the step of exposing the first radiation curable coating composition to the magnetic field of the first magnetic assembly (x00-$a$) described herein (step b)). Preferably, the step of at least partially curing the second radiation curable coating composition to a second state so as to fix the non-spherical magnetic or magnetizable pigment particles in their adopted positions and orientations and so as to form one or more at least partially cured second patterns (step e)) is carried out partially simultaneously with the step of exposing the second radiation curable coating composition to the magnetic field of the second magnetic assembly (x00-$b$) described herein (step e)). Preferably, the process for producing the optical effect layer (OEL) (x20) described herein on the substrate (x10) described herein comprises the step c) being carried out partially simultaneously with step b) and the step f) being carried out partially simultaneously with step e). By "partially simultaneously", it is meant that both steps are partly performed simultaneously, i.e. the times of performing each of the steps partially overlap. In the context described herein, when curing is performed partially simultaneously with the orientation step b) and the orientation step e), respectively, it must be understood that curing becomes effective after the orientation so that the pigment particles orient before the complete or partial hardening of the OEL.

The first and second states of the first and second radiation curable coating compositions are provided by using a certain type of radiation curable coating composition. For example, the components of the first and second radiation curable coating compositions other than the non-spherical magnetic or magnetizable pigment particles may take the form of an ink or radiation curable coating composition such as those which are used in security applications, e.g. for banknote printing. The aforementioned first and second states are provided by using a material that shows an increase in viscosity in reaction to an exposure to an electromagnetic radiation. That is, when the fluid binder material is cured or solidified, said binder material converts into the second state where the non-spherical magnetic or magnetizable pigment particles are fixed in their current positions and orientations and can no longer move nor rotate within the binder material.

As known to those skilled in the art, ingredients comprised in a radiation curable coating composition to be applied onto a surface such as a substrate and the physical properties of said radiation curable coating composition must fulfil the requirements of the process used to transfer the radiation curable coating composition to the substrate surface. Consequently, the binder material comprised in the first and second radiation curable coating composition described herein is typically chosen among those known in the art and depends on the coating or printing process used to apply the first and second radiation curable coating composition and the chosen radiation curing process.

In the optical effect layers (OELs) (x20) described herein, the non-spherical magnetic or magnetizable pigment particles described herein are respectively dispersed in the first and second radiation curable coating composition comprising a cured binder material that fixes/freezes the orientation of the non-spherical magnetic or magnetizable pigment particles. The cured binder material is at least partially transparent to electromagnetic radiation of a range of wavelengths comprised between 200 nm and 2500 nm. The binder material is thus, at least in its cured or solid state (also referred to as second state herein), at least partially transparent to electromagnetic radiation of a range of wavelengths comprised between 200 nm and 2500 nm, i.e. within the wavelength range which is typically referred to as the "optical spectrum" and which comprises infrared, visible and UV portions of the electromagnetic spectrum, such that the particles contained in the binder material in its cured or solid state and their orientation-dependent reflectivity can be perceived through the binder material. Preferably, the cured binder material is at least partially transparent to electromagnetic radiation of a range of wavelengths comprised between 200 nm and 800 nm, more preferably comprised between 400 nm and 700 nm. Herein, the term "transparent" denotes that the transmission of electromagnetic radiation through a layer of 20 µm of the cured binder material as present in the OEL (x20) (not including the platelet-shaped magnetic or magnetizable pigment particles, but all other optional components of the OEL in case such components are present) is at least 50%, more preferably at least 60%, even more preferably at least 70%, at the wavelength(s) concerned. This can be determined for example by measuring the transmittance of a test piece of the cured binder material (not including the non-spherical magnetic or magnetizable pigment particles) in accordance with well-established test methods, e.g. DIN 5036-3 (1979-11). If the OEL (x20) serves as a covert security feature, then typically technical means will be necessary to detect the (complete) optical effect generated by the OEL (x20) under respective illuminating conditions comprising the selected non-visible wavelength; said detection requiring that the wavelength of incident radiation is selected outside the visible range, e.g. in the near UV-range. In this case, it is preferable that the OEL (x20) comprises luminescent pigment particles that show luminescence in response to the selected wavelength outside the visible spectrum contained in the incident radiation. The infrared, visible and UV portions of the electromagnetic spectrum approximately correspond to the wavelength ranges between 700-2500 nm, 400-700 nm, and 200-400 nm respectively.

As mentioned hereabove, the first and second radiation curable coating compositions described herein depends on the coating or printing process used to apply said radiation curable coating compositions and the chosen curing process. Preferably, curing of the first and second radiation curable coating compositions involves a chemical reaction which is not reversed by a simple temperature increase (e.g. up to 80° C.) that may occur during a typical use of an article comprising the OEL (x20) described herein. The term "curing" or "curable" refers to processes including the chemical reaction, crosslinking or polymerization of at least one component in the applied radiation curable coating composition in such a manner that it turns into a polymeric material having a greater molecular weight than the starting substances. Radiation curing advantageously leads to an instantaneous increase in viscosity of the radiation curable coating composition after exposure to the curing irradiation, thus preventing any further movement of the pigment particles and in consequence any loss of information after the magnetic orientation step. Preferably, the curing step (step c)) is carried out by radiation curing including UV-visible light radiation curing or by E-beam radiation curing, more preferably by UV-Vis light radiation curing.

Therefore, suitable first and second radiation curable coating compositions for the present invention include radiation curable compositions that may be cured by UV-visible light radiation (hereafter referred as UV-Vis radiation curable) or by E-beam radiation (hereafter referred as EB). Radiation curable compositions are known in the art and can be found in standard textbooks such as the series "Chemistry & Technology of UV & EB Formulation for Coatings, Inks & Paints", Volume IV, Formulation, by C. Lowe, G. Webster, S. Kessel and I. McDonald, 1996 by John Wiley & Sons in association with SITA Technology Limited. According to one particularly preferred embodiment of the present invention, the first and second radiation curable coating compositions described herein are UV-Vis radiation curable coating compositions.

Preferably, the first and second UV-Vis radiation curable coating composition independently comprise one or more compounds selected from the group consisting of radically curable compounds and cationically curable compounds. The first and second UV-Vis radiation curable coating compositions described herein may independently be hybrid systems and comprise a mixture of one or more cationically curable compounds and one or more radically curable compounds. Cationically curable compounds are cured by cationic mechanisms typically including the activation by radiation of one or more photoinitiators which liberate cationic species, such as acids, which in turn initiate the curing so as to react and/or cross-link the monomers and/or oligomers to thereby cure the radiation curable coating composition. Radically curable compounds are cured by free radical mechanisms typically including the activation by radiation of one or more photoinitiators, thereby generating radicals which in turn initiate the polymerization so as to cure the radiation curable coating composition. Depending on the monomers, oligomers or prepolymers used to prepare the binder comprised in the first and second UV-Vis radiation curable coating compositions described herein, different photoinitiators might be used. Suitable examples of free radical photoinitiators are known to those skilled in the art and include without limitation acetophenones, benzophenones, benzyldimethyl ketals, alpha-aminoketones, alpha-hydroxyketones, phosphine oxides and phosphine oxide derivatives, as well as mixtures of two or more thereof. Suitable examples of cationic photoinitiators are known to those skilled in the art and include without limitation onium salts such as organic iodonium salts (e.g. diaryl iodoinium salts), oxonium (e.g. triaryloxonium salts) and sulfonium salts (e.g. triarylsulphonium salts), as well as mixtures of two or more thereof. Other examples of useful photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures of two or more thereof. The one or more photoinitiators comprised in the UV-Vis radiation curable coating compositions are preferably present in a total amount from about 0.1 wt-% to about 20 wt-%, more preferably about 1 wt-% to about 15 wt-%, the weight percents being based on the total weight of the UV-Vis radiation curable coating compositions.

The first and second radiation curable coating composition described herein may independently further comprise one or more marker substances or taggants and/or one or more machine readable materials selected from the group consisting of magnetic materials (different from the platelet-shaped magnetic or magnetizable pigment particles described herein), luminescent materials, electrically conductive materials and infrared-absorbing materials. As used herein, the term "machine readable material" refers to a material which exhibits at least one distinctive property which is not perceptible by the naked eye, and which can be comprised in a layer so as to confer a way to authenticate said layer or article comprising said layer by the use of a particular equipment for its authentication.

The first and second radiation curable coating composition described herein may independently further comprise one or more coloring components selected from the group consisting of organic pigment particles, inorganic pigment particles, and organic dyes, and/or one or more additives. The latter include without limitation compounds and materials that are used for adjusting physical, rheological and chemical parameters of the radiation curable coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties (polymerization inhibitors) etc. Additives described herein may be present in the radiation curable coating composition in amounts and in forms known in the art, including so-called nano-materials where at least one of the dimensions of the additive is in the range of 1 to 1000 nm.

The binder(s), the photoinitiator(s), the marker substance (s), the taggant(s), the machine readable material(s), the coloring component(s) and additive(s) of first and second radiation curable coating compositions described herein may independently be the same or may independently be different.

The first and second radiation curable coating compositions described herein independently comprises the non-spherical magnetic or magnetizable pigment particles described herein. Preferably, the non-spherical magnetic or magnetizable pigment particles are present in an amount from about 2 wt-% to about 40 wt-%, more preferably about 4 wt-% to about 30 wt-%, the weight percents being based on the total weight of the first radiation curable coating composition comprising the binder material, the non-spherical magnetic or magnetizable pigment particles and other optional components of the first radiation curable coating composition, respectively. Preferably, the non-spherical magnetic or magnetizable pigment particles are present in an amount from about 2 wt-% to about 40 wt-%, more preferably about 4 wt-% to about 30 wt-%, the weight percents being based on the total weight of the second radiation curable coating composition comprising the binder material, the non-spherical magnetic or magnetizable pigment particles and other optional components of the second radiation curable coating composition, respectively.

According to one embodiment of the present invention, the first radiation curable coating composition and the second radiation curable coating composition described herein comprise a different amount of the non-spherical magnetic or magnetizable pigment particles described herein, wherein the non-spherical magnetic or magnetizable pigment particles are preferably present in an amount from about 2 wt-% to about 40 wt-%, more preferably about 4 wt-% to about 30 wt-% in the first radiation curable coating composition and wherein the non-spherical magnetic or magnetizable pigment particles are preferably present in an amount from about 2 wt-% to about 40 wt-%, more preferably about 4 wt-% to about 30 wt-% in the second radiation curable coating composition. According to another embodiment of the present invention, the first radiation curable coating composition and the second first and second radiation curable coating composition described herein comprise about a same amount of the non-spherical magnetic or magnetizable pigment particles described herein in the first and radiation curable coating compositions, preferably in an amount from about 2 wt-% to about 40 wt-%, more preferably about 4 wt-% to about 30 wt-%.

Non-spherical magnetic or magnetizable pigment particles described herein are defined as having, due to their non-spherical shape, non-isotropic reflectivity with respect to an incident electromagnetic radiation for which the hardened binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction. Preferably, the non-spherical magnetic or magnetizable pigment particles described herein have a non-isotropic reflectivity with respect to incident electromagnetic radiation in some parts or in the complete wavelength range of from about 200 to about 2500 nm, more preferably from about 400 to about 700 nm, such that a change of the particle's orientation results in a change of reflection by that particle into a certain direction. As known by the man skilled in the art, the magnetic or magnetizable pigment particles described herein are different from conventional pigments, said conventional pigment particles displaying the same color for all viewing angles, whereas the magnetic or magnetizable pigment particles described herein exhibit non-isotropic reflectivity as described hereabove.

The non-spherical magnetic or magnetizable pigment particles are preferably prolate or oblate ellipsoid-shaped, platelet-shaped or needle-shaped particles or a mixture of two or more thereof and more preferably platelet-shaped particles.

Suitable examples of non-spherical magnetic or magnetizable pigment particles described herein include without limitation pigment particles comprising a magnetic metal selected from the group consisting of cobalt (Co), iron (Fe), gadolinium (Gd) and nickel (Ni); magnetic alloys of iron, manganese, cobalt, nickel and mixtures of two or more thereof; magnetic oxides of chromium, manganese, cobalt, iron, nickel and mixtures of two or more thereof; and mixtures of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of non-spherical magnetic or magnetizable pigment particles described herein include without limitation pigment particles comprising a magnetic layer M made from one or more of a magnetic metal such as cobalt (Co), iron (Fe), gadolinium (Gd) or nickel (Ni); and a magnetic alloy of iron, cobalt or nickel, wherein said platelet-shaped magnetic or magnetizable pigment particles may be multilayered structures comprising one or more additional layers. Preferably, the one or more additional layers are layers A independently made from one or more materials selected from the group consisting of metal fluorides such as magnesium fluoride ($MgF_2$), silicon oxide (SiO), silicon dioxide ($SiO_2$), titanium oxide ($TiO_2$), zinc sulphide (ZnS) and aluminum oxide ($Al_2O_3$), more preferably silicon dioxide ($SiO_2$); or layers B independently made from one or more materials selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A multilayer structures, B/M multilayer structures, B/M/B multilayer structures, B/A/M/A multilayer structures, B/A/M/B multilayer structures, B/A/M/B/A multilayer structures, wherein the layers A, the magnetic layers M and the layers B are chosen from those described hereabove.

At least part of the non-spherical magnetic or magnetizable pigment particles described herein may be constituted by non-spherical optically variable magnetic or magnetizable pigment particles and/or non-spherical magnetic or magnetizable pigment particles having no optically variable properties. Preferably, at least a part of the non-spherical magnetic or magnetizable pigment particles described herein is constituted by non-spherical optically variable magnetic or magnetizable pigment particles. In addition to the overt security provided by the colorshifting property of non-spherical optically variable magnetic or magnetizable pigment particles, which allows easily detecting, recognizing and/or discriminating an article or security document carrying an ink, radiation curable coating composition, coating or layer comprising the non-spherical optically variable magnetic or magnetizable pigment particles described herein from their possible counterfeits using the unaided human senses, the optical properties of the platelet-shaped optically variable magnetic or magnetizable pigment particles may also be used as a machine readable tool for the recognition of the OEL. Thus, the optical properties of the non-spherical optically variable magnetic or magnetizable pigment particles may simultaneously be used as a covert or semi-covert security feature in an authentication process wherein the optical (e.g. spectral) properties of the pigment particles are analyzed. The use of non-spherical optically variable magnetic or magnetizable pigment particles in radiation curable coating compositions for producing the OEL (x20) enhances the significance of said OEL as a security feature in security document applications, because such materials (i.e. non-spherical optically variable magnetic or magnetizable pigment particles) are reserved to the security document printing industry and are not commercially available to the public.

Moreover, and due to their magnetic characteristics, the non-spherical magnetic or magnetizable pigment particles described herein are machine readable, and therefore radiation curable coating compositions comprising those pigment particles may be detected for example with specific magnetic detectors. Radiation curable coating compositions comprising the non-spherical magnetic or magnetizable pigment particles described herein may therefore be used as a covert or semi-covert security element (authentication tool) for security documents.

As mentioned above, preferably at least a part of the non-spherical magnetic or magnetizable pigment particles is constituted by non-spherical optically variable magnetic or magnetizable pigment particles. These can more preferably be selected from the group consisting of non-spherical magnetic thin-film interference pigment particles, non-spherical magnetic cholesteric liquid crystal pigment particles, non-spherical interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of absorber/dielectric/reflector/magnetic/reflector/dielectric/absorber multilayer structures such as disclosed in U.S. Pat. No. 4,838,648.

Preferably, the reflector layers described herein are independently made from one or more materials selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more materials selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicon oxide (SiO), silicon dioxide ($SiO_2$), titanium oxide ($TiO_2$), aluminum oxide ($Al_2O_3$), more preferably selected from the group consisting of magnesium fluoride ($MgF_2$) and silicon dioxide ($SiO_2$) and still more preferably magnesium fluoride ($MgF_2$). Preferably, the absorber layers are independently made from one or more materials selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a $Cr/MgF_2/Al/M/Al/MgF_2/Cr$ multilayer structure, wherein M a magnetic layer comprising nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co).

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 A1 which is hereby incorporated by reference in its entirety.

Magnetic thin film interference pigment particles described herein are typically manufactured by a conventional deposition technique for the different required layers onto a web. After deposition of the desired number of layers, e.g. by physical vapor deposition (PVD), chemical vapor deposition (CVD) or electrolytic deposition, the stack of layers is removed from the web, either by dissolving a release layer in a suitable solvent, or by stripping the material from the web. The so-obtained material is then broken down to platelet-shaped pigment particles which have to be further processed by grinding, milling (such as for example jet milling processes) or any suitable method so as to obtain pigment particles of the required size. The resulting product consists of flat platelet-shaped pigment particles with broken edges, irregular shapes and different aspect ratios. Further information on the preparation of suitable platelet-shaped magnetic thin film interference pigment particles can be found e.g. in EP 1 710 756 A1 and EP 1 666 546 A1 which are hereby incorporated by reference.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781 and 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose cholesteric multilayer pigment particles which comprise the sequence $A^1/B/A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicon dioxides ($SiO_2$), aluminum oxides ($Al_2O_3$), titanium oxides ($TiO_2$), graphites and mixtures of two or more thereof. Furthermore, one or more additional layers such as coloring layers may be present.

The non-spherical magnetic or magnetizable pigment particles described herein may be surface treated so at to protect them against any deterioration that may occur in the radiation curable coating composition and/or to facilitate their incorporation in the radiation curable coating composition; typically corrosion inhibitor materials and/or wetting agents may be used.

According to one embodiment of the present invention, the first radiation curable coating composition and the second first and second radiation curable coating composition described herein comprise different non-spherical magnetic or magnetizable pigment particles described herein in terms of size and/or color properties including for example optically variable properties. According to another embodiment of the present invention, the first radiation curable coating composition and the second first and second radiation curable coating composition described herein comprise the same non-spherical magnetic or magnetizable pigment particles described herein in terms of size and/or color properties including for example optically variable properties. According to one embodiment of the present invention, the first radiation curable coating composition and the second radiation curable coating composition described herein are the same.

According to one embodiment and provided that the non-spherical magnetic or magnetizable pigment particles are platelet-shaped pigment particles, the process for producing the optical effect layer described herein may further comprise one or two steps of exposing the radiation curable coating composition described herein to a dynamic magnetic field of a magnetic-field-generating device so as to bi-axially orient at least a part of the platelet-shaped magnetic or magnetizable pigment particles. According to one embodiment, the process further comprises a step of exposing the first radiation curable coating composition to a dynamic magnetic field of a magnetic-field-generating device so as to bi-axially orient at least a part of the platelet-shaped magnetic or magnetizable pigment particles, said step being carried out after step a) and before step b) and/or the process further comprises a step of exposing the second radiation curable coating composition to a dynamic magnetic field of a magnetic-field-generating device so as to bi-axially orient at least a part of the platelet-shaped magnetic or magnetizable pigment particles, said step being carried out after step d) and before step e).

Processes comprising such steps of exposing a coating composition to a dynamic magnetic field of a first magnetic-field-generating device so as to bi-axially orient at least a part of the platelet-shaped magnetic or magnetizable pigment particles before a step of further exposing the coating composition to a second magnetic-field-generating device, are disclosed in WO 2015/086257 A1. Subsequently to the exposure of the radiation curable coating composition to the dynamic magnetic field of the first magnetic-field-generating device described herein and while the radiation curable coating composition is still wet or soft enough so that the platelet-shaped magnetic or magnetizable pigment particles therein can be further moved and rotated, the platelet-shaped magnetic or magnetizable pigment particles are further re-oriented by the use of the magnetic field of first/second magnetic assembly (x00-a, x00-b) described herein.

Carrying out a bi-axial orientation means that platelet-shaped magnetic or magnetizable pigment particles are made to orientate in such a way that their two main axes are constrained. That is, each platelet-shaped magnetic or magnetizable pigment particle can be considered to have a major axis in the plane of the pigment particle and an orthogonal minor axis in the plane of the pigment particle. The major and minor axes of the platelet-shaped magnetic or magnetizable pigment particles are each caused to orient according to the dynamic magnetic field. Effectively, this results in neighboring platelet-shaped magnetic pigment particles that are close to each other in space to be essentially parallel to each other. In order to perform a bi-axial orientation, the platelet-shaped magnetic pigment particles must be subjected to a strongly time-dependent external magnetic field. Put another way, bi-axial orientation aligns the planes of the platelet-shaped magnetic or magnetizable pigment particles so that the planes of said pigment particles are oriented to be essentially parallel relative to the planes of neighboring (in all directions) platelet-shaped magnetic or magnetizable pigment particles. In an embodiment, both the major axis and the minor axis perpendicular to the major axis described hereabove of the planes of the platelet-shaped magnetic or magnetizable pigment particles are oriented by the dynamic magnetic field so that neighboring (in all directions) pigment particles have their major and minor axes aligned with each other.

According to one embodiment, the step of carrying out a bi-axial orientation of the platelet-shaped magnetic or magnetizable pigment particles leads to a magnetic orientation wherein the platelet-shaped magnetic or magnetizable pigment particles have their two main axes substantially parallel to the substrate surface. For such an alignment, the platelet-shaped magnetic or magnetizable pigment particles are planarized within the radiation curable coating composition on the substrate and are oriented with both their X-axis and Y-axis (shown in FIG. 1 of WO 2015/086257 A1) parallel with the substrate surface.

According to another embodiment, the step of carrying a bi-axial orientation of the platelet-shaped magnetic or magnetizable pigment particles leads to a magnetic orientation wherein the platelet-shaped magnetic or magnetizable pigment particles have a first axis within the X-Y plane substantially parallel to the substrate surface and a second axis being perpendicular to said first axis at a substantially non-zero elevation angle to the substrate surface.

According to another embodiment, the step of carrying a bi-axial orientation of the platelet-shaped magnetic or magnetizable pigment particles leads to a magnetic orientation wherein the platelet-shaped magnetic or magnetizable pigment particles have their X-Y plane parallel to an imaginary spheroid surface.

Particularly preferred magnetic-field-generating devices for bi-axially orienting the platelet-shaped magnetic or magnetizable pigment particles are disclosed in EP 2 157 141 A1. The magnetic-field-generating device disclosed in EP 2 157 141 A1 provides a dynamic magnetic field that changes its direction forcing the platelet-shaped magnetic or magnetizable pigment particles to rapidly oscillate until both main axes, X-axis and Y-axis, become parallel to the substrate surface, i.e. the platelet-shaped magnetic or magnetizable pigment particles rotate until they come to the stable sheet-like formation with their X and Y axes parallel to the substrate surface and are planarized in said two dimensions.

Other particularly preferred magnetic-field-generating devices for bi-axially orienting the platelet-shaped magnetic or magnetizable pigment particles comprise linear permanent magnet Halbach arrays, i.e. assemblies comprising a plurality of magnets with different magnetization directions. Detailed description of Halbach permanent magnets was given by Z. Q. Zhu et D. Howe (Halbach permanent magnet machines and applications: a review, *IEE. Proc. Electric Power Appl.*, 2001, 148, p. 299-308). The magnetic field produced by such a Halbach array has the properties that it is concentrated on one side while being weakened almost to zero on the other side. The co-pending Application EP 14195159.0 discloses suitable devices for bi-axially orienting platelet-shaped magnetic or magnetizable pigment particles, wherein said devices comprise a Halbach cylinder assembly. Other particularly preferred magnetic-field-generating devices for bi-axially orienting the platelet-shaped magnetic or magnetizable pigment particles are spinning magnets, said magnets comprising disc-shaped spinning magnets or magnet assemblies that are essentially magnetized along their diameter. Suitable spinning magnets or magnet assemblies are described in US 2007/0172261 A1, said spinning magnets or magnet assemblies generate radially symmetrical time-variable magnetic fields, allowing the bi-orientation of platelet-shaped magnetic or magnetizable pigment particles of a not yet hardened coating composition. These magnets or magnet assemblies are driven by a shaft (or spindle) connected to an external motor. CN 102529326 B discloses examples of magnetic-field-generating devices comprising spinning magnets that might be suitable for bi-axially orienting platelet-shaped magnetic or magnetizable pigment particles. In a preferred embodiment, suitable magnetic-field-generating devices for bi-axially orienting platelet-shaped magnetic or magnetizable pigment particles are shaft-free disc-shaped spinning magnets or magnet assemblies constrained in a housing made of non-magnetic, preferably non-conducting, materials and are driven by one or more magnet-wire coils wound around the housing. Examples of such shaft-free disc-shaped spinning magnets or magnet assemblies are disclosed in WO 2015/082344 A1 and in WO 2016/026896 A1.

The substrate (x10) described herein is preferably selected from the group consisting of papers or other fibrous materials, such as cellulose, paper-containing materials, glasses, metals, ceramics, plastics and polymers, metalized plastics or polymers, composite materials and mixtures or combinations thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate (x10). Typical examples of metalized plastics or polymers include the plastic or polymer materials described hereabove having a metal disposed continuously or discontinuously on their surface. Typical example of metals include without limitation aluminum (Al), chromium (Cr), copper (Cu), gold (Au), iron (Fe), nickel (Ni), silver (Ag), combinations thereof or alloys of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate (x10) can comprise further additives that are known to the skilled person, such as sizing agents, whiteners, processing aids, reinforcing or wet strengthening agents, etc. The substrate (x10) described herein may be provided under the form of a web (e.g. a continuous sheet of the materials described hereabove) or under the form of sheets. Should the OEL (x20) produced according to the present invention be on a security document, and with the aim of further increasing the security level and the resistance against counterfeiting and illegal reproduction of said security document, the substrate (x10) may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents, the substrate (x10) may comprise one or more marker substances or taggants and/or machine readable substances (e.g. luminescent substances, UV/visible/IR absorbing substances, magnetic substances and combinations thereof).

Also described herein are first and second magnetic assemblies (x00-*a*, x00-*b*) for producing the OELs (x20) described herein on the substrates (x10) described herein, said OELs (x20) comprising the non-spherical magnetic or magnetizable pigment particles being oriented in the cured first radiation curable coating composition and the non-spherical magnetic or magnetizable pigment particles being oriented in the cured second radiation curable coating composition such as described herein.

For each of the first and second magnetic assemblies (x00-*a*, x00-*b*), the magnetic field produced by the magnetic-field generating device (x30) and the magnetic field produced by the magnetic-field generating device (x40) interact so that the resulting magnetic field of the first and second magnetic assemblies (x00-*a*, x00-*b*), respectively, is independently able to orient at least a part of the non-spherical magnetic or magnetizable pigment particles in the not yet cured first and second radiation curable coating compositions, which are disposed in the magnetic field of the first/second magnetic assemblies (x00-*a*, x00-*b*), respectively, to produce an optical impression of one or more loop-shaped bodies having a size that varies upon tilting the optical effect layer (x10).

Suitable magnetic assemblies (x00-*a*, x00-*b*) are disclosed in WO 2017/064052 A1, WO 20170/80698 A1 and WO 2017/148789 A1 which are hereby incorporated by reference in its entirety.

FIG. 2-5 illustrate examples of magnetic assemblies (x00-*a*, x00-*b*) suitable for producing the optical effect layers (OELs) (x20) described herein when used in two independent orientation steps (steps b) and e)), wherein said magnetic assemblies (x00-*a*, x00-*b*) comprise the magnetic-field generating device (x30) and the magnetic-field generating device (x40) described herein.

The magnetic assemblies (x00-*a*, x00-*b*) described herein comprises the magnetic-field generating device (x30)

described herein, said magnetic-field generating device (x30) comprising the loop-shaped magnetic-field generating device (x31) being either a single loop-shaped dipole magnet or a combination of two or more dipole magnets disposed in a loop-shaped arrangement. Typical examples of combinations of two or more dipole magnets disposed in a loop-shaped arrangement include without limitation a combination of two dipole magnets disposed in a circular loop-shaped arrangement, three dipole magnets disposed in a triangular loop-shaped arrangement or a combination of four dipole magnets disposed in a square or rectangular loop-shaped arrangement.

According to some embodiments, the magnetic assemblies (x00-a, x00-b) described herein comprises the magnetic-field generating device (x30) described herein, said magnetic-field generating device (x30) further comprising the supporting matrix (x34) described herein. The supporting matrix (x34) described herein holds together all the parts comprised in the magnetic-field generating device (x30) described herein, i.e. loop-shaped magnetic-field generating device (x31), the single dipole magnet (x32) or the two or more dipole magnets (x32) when present, and the one or more pole pieces (x33) when present. In particular, the supporting matrix (x34) described herein holds the single dipole magnet (x32) or the two or more dipole magnets (x32) within the loop defined by, and in spaced relation to, the single loop-shaped magnetic-field generating device (x31) or within the loop defined by, and in spaced relation to, the two or more dipole magnets in the loop-shaped arrangement. The loop-shaped magnetic-field generating device (x31) may be disposed symmetrically within the supporting matrix (x34) or may be disposed non-symmetrically within the supporting matrix (x34).

The supporting matrix (x34) described herein comprises one or more indentations or grooves for receiving the loop-shaped magnetic-field generating device (x31) described herein, the single dipole magnet (x32) or the two or more dipole magnets (x32) described herein when present and the one or more pole pieces (x33) when present.

The supporting matrix (x34) of the magnetic-field generating device (x30) described herein is made of one or more non-magnetic materials. The non-magnetic materials are preferably selected from the group consisting of low conducting materials, non-conducting materials and mixtures thereof, such as for example engineering plastics and polymers, aluminum, aluminum alloys, titanium, titanium alloys and austenitic steels (i.e. non-magnetic steels). Engineering plastics and polymers include without limitation polyaryletherketones (PAEK) and its derivatives polyetheretherketones (PEEK), poletherketoneketones (PEKK), polyetheretherketoneketones (PEEKK) and polyetherketoneetherketoneketone (PEKEKK); polyacetals, polyamides, polyesters, polyethers, copolyetheresters, polyimides, polyetherimides, high-density polyethylene (HDPE), ultra-high molecular weight polyethylene (UHMWPE), polybutylene terephthalate (PBT), polypropylene, acrylonitrile butadiene styrene (ABS) copolymer, fluorinated and perfluorinated polyethylenes, polystyrenes, polycarbonates, polyphenylenesulfide (PPS) and liquid crystal polymers. Preferred materials are PEEK (polyetheretherketone), POM (polyoxymethylene), PTFE (polytetrafluoroethylene), Nylon® (polyamide) and PPS.

The magnetic assemblies (x00-a, x00-b) described herein comprise the magnetic-field generating device (x40) described herein, said magnetic-field generating device (x40) being either the single bar dipole magnet having a magnetic axis substantially parallel to the substrate (x10) surface or the combination of two or more bar dipole magnets (x41) described herein. When the magnetic-field generating device (x40) is a combination of two or more bar dipole magnets (x41), said two or more bar dipole magnets (x41) may be separated by one or more spacer pieces (x42) made of a non-magnetic material or may be comprised in a supporting matrix made of a non-magnetic material. The non-magnetic materials are preferably selected from the materials provided for the supporting matrix (x34).

During the first orientation step (step b)) and the second orientation step e)), the distance (h) between the top surface of magnetic-field generating device (x30) or the top surface of magnetic-field generating device (x40), (i.e. the part that is the closest to the substrate (x10) surface), and the surface of the substrate (x10) facing said magnetic-field generating device (x30) or said magnetic-field generating device (x40) is independently preferably between about 0.1 and about 10 mm and more preferably between about 0.2 and about 5 mm.

During the first orientation step (step b)) and the second orientation step e)), the distance (d) between the magnetic-field generating device (x30) and the magnetic-field generating device (x40) may be independently comprised in the range comprised between about 0 and about 10 mm, preferably between about 0 and about 3 mm.

First Embodiment of Magnetic Assemblies (x00-a, x00-b

According to a first embodiment, the magnetic assemblies (x00-a, x00-b) for producing the OELs (x20) described herein on the substrate (x10) described herein comprises:
  i) the magnetic-field generating device (x30) comprising the loop-shaped magnetic-field generating device (x31) being either the single loop-shaped dipole magnet having a magnetic axis substantially perpendicular to the substrate (x10) surface or the combination of two or more dipole magnets disposed in a loop-shaped arrangement and having a resulting magnetic axis substantially perpendicular to the substrate (x10) surface as described herein, wherein said magnetic-field generating device (x30) may further comprise a supporting matrix (x34) such as those described herein and may further comprise one or more pole pieces (x33) such as those described herein, and
  ii) the magnetic-field generating device (x40) being either the single bar dipole magnet having a magnetic axis substantially parallel to the substrate (x10) surface or the combination of two or more bar dipole magnets (x41) having a resulting magnetic axis substantially parallel to the substrate (x10) surface as described herein. When the magnetic-field generating device (x40) is a combination of two or more bar dipole magnets (x41) having a resulting magnetic axis substantially parallel to the substrate (x10) surface, said two or more bar dipole magnets (x41) may be arranged in a symmetric configuration or in an asymmetric configuration. Preferably, all of the two or more bar dipole magnets (x41) have the same magnetic direction, i.e. all of them have their North pole facing the same direction.

The magnetic-field generating device (x30) may be placed on top of the magnetic-field generating device (x40) or alternatively, the magnetic-field generating device (x40) may be placed on top of the magnetic-field generating device (x30). The distance (d) between the magnetic-field generating device (x30) and the magnetic-field generating device (x40) may be comprised in the range comprised between about 0 and about 10 mm, preferably between about 0 and about 3 mm.

According to one embodiment shown in FIG. 2A-B and FIG. 5A-B, the magnetic assemblies (x00-*a*, x00-*b*) for producing the OELs (x20) described herein on the substrates (x10) described herein comprises i) the magnetic-field generating device (x30) described herein and comprising i-1) the supporting matrix (x34) described herein, i-2) the loop-shaped magnetic-field generating device (x31) being the single loop-shaped, in particular the ring-shaped, dipole magnet described herein and having a magnetic axis substantially perpendicular to the substrate (x10) surface as described herein, and i-3) the one or more pole pieces (x33), in particular the one or more loop-shaped pole pieces, described herein, wherein said one or more loop-shaped, in particular ring-shaped, pole pieces are disposed symmetrically within the loop of the loop-shaped magnetic-field generating device (x31) and ii) the magnetic-field generating device (x40) being the combination of two or more bar dipole magnets (x41) described herein, each of the two or more bar dipole magnets (x41) having a magnetic axis substantially parallel to the substrate (x10) surface and having a same magnetic field direction, wherein the two or more bar dipole magnets (x41) may be separated by the one or more spacer pieces (x42) described herein, and wherein the magnetic-field generating device (x30) is placed on top of the magnetic-field generating device (x40).

FIG. 2A-B and FIG. 5A-B illustrate examples of magnetic assemblies (200-*a*, 200-*b*/500-*a*, 500-*b*) suitable for the first orientation step (step b)) or for the second orientation step (step e)) described herein, said magnetic assemblies (200-*a*, 200-*b*/500-*a*, 500-*b*) comprising a magnetic-field generating device (230/530) and a magnetic-field generating device (240/540).

The magnetic assemblies (200-*a*, 200-*b*/500-*a*, 500-*b*) of FIGS. 2A and 5A comprises a magnetic-field generating device (240/540) being a combination of two or more bar dipole magnets (241/641) described herein, said magnetic-field generating device (240/540) being disposed below the magnetic-field generating device (230/630), wherein each of the two or more bar dipole magnets (241/541) has a magnetic axis substantially parallel to the substrate (210/510) surface and their North pole facing the same direction.

The magnetic-field generating device (240/540) is a combination of two or more, seven bar dipole magnets in FIGS. 2A and 5A, bar dipole magnets (241/541) and one or more, six in FIGS. 2A and 5A, spacer pieces (242/542), made of a non-magnetic material such as those described herein for the supporting matrix (x34). As shown in FIGS. 2A and 5A, the arrangement of the two or more bar dipole magnets (241/541) and the spacer pieces (242/542) may be non-symmetrical.

Each of the two or more bar dipole magnets (241) may be a parallelepiped having a length (B1), a width (B2) and a thickness (B3) as shown in FIG. 2A. Each of the spacer pieces (242) may be a parallelepiped having a length (B4), a width (B5) and a thickness (B6). Each of the two or more bar dipole magnets (541) may be a parallelepiped having a length (L1), a width (L2*a*) and a thickness (L3) as shown in FIG. 5A. Each of the spacer pieces (542) may be a parallelepiped having a length, a width (L2*b*) and a thickness (L3).

The magnetic-field generating device (230) comprises the supporting matrix (234) which may be a parallelepiped having a length (A6), a width (A7) and a thickness (A8) as shown in FIG. 2A. The magnetic-field generating device (530) comprises a supporting matrix (534) which may be a parallelepiped having a length (L4), a width (L5) and a thickness (L6) as shown in FIG. 5A.

The magnetic-field generating device (230/530) of FIGS. 2A and 5A comprises the supporting matrix (234/534), the loop-shaped magnetic-field generating device being a ring-shaped dipole magnet (231/531) and the one or more loop-shaped pole pieces (233/533), in particular one ring-shaped pole piece as shown in FIGS. 2A and 5A such as those described herein. The loop-shaped magnetic-field generating device being a ring-shaped dipole magnet (231) has an external diameter (A1), an internal diameter (A2) and a thickness (A5). The loop-shaped magnetic-field generating device being a ring-shaped dipole magnet (531) has an external diameter (L7), an internal diameter (L8) and a thickness (L9). The magnetic axis of the ring-shaped dipole magnet (231/531) is substantially perpendicular to the magnetic axis of the magnetic-field generating device (240/540), i.e. substantially perpendicular to the substrate (210/510) surface with the South pole facing the substrate (210/510).

The one or more, in particular one, loop-shaped pole pieces (233) being a ring-shaped pole piece (233) has an external diameter (A3), an internal diameter (A4) and a thickness (A5). The one or more, in particular one, loop-shaped pole pieces (533) being a ring-shaped pole piece (533) has an external diameter (L10), an internal diameter (L11) and a thickness (L9).

The magnetic-field generating device (230/530) and the magnetic-field generating device (240/540) are preferably in direct contact, i.e. the distance (d) between the bottom surface of the supporting matrix (234/534) and top surface the bar dipole magnet (240/540) is about 0 mm (not shown true to scale in FIGS. 2A and 5A for the clarity of the drawing). The distance between the top surface of the supporting matrix (234/534) and the surface of the substrate (210/510) facing said supporting matrix (234/534) is illustrated by the distance (h). Preferably, the distance (h) is between about 0.1 and about 10 mm and more preferably between about 0.2 and about 6 mm.

Second Embodiment of Magnetic Assemblies (x00-*a*, x00-*b*

According to a second embodiment, the magnetic assemblies (x00-*a*, x00-*b*) for producing the OELs (x20) described herein on the substrate (x10) described herein comprises
  i) the magnetic-field generating device (x30) comprising i-1) the supporting matrix (x34) described herein, i-2) the loop-shaped magnetic-field generating device (x31) being either the single loop-shaped dipole magnet having a magnetic axis substantially perpendicular to the substrate (x10) surface or the combination of two or more dipole magnets disposed in a loop-shaped arrangement, each of the two or more dipole magnets having a magnetic axis substantially perpendicular to the substrate (x10) surface and having a same magnetic field direction as described herein, i-3) the single dipole magnet (x32) having a magnetic axis substantially perpendicular to the substrate (x10) surface or the two or more dipole magnets (x32) having a magnetic axis substantially perpendicular to the substrate (x10) surface and having a same magnetic field direction as described herein and/or the one or more pole pieces (x33) described herein, and
  ii) the magnetic-field generating device (x40) being either the single bar dipole magnet having a magnetic axis substantially parallel to the substrate (x10) surface or the combination of two or more bar dipole magnets (x41), each of the two or more bar dipole magnets (x41) having a magnetic axis substantially parallel to the substrate (x10) surface and having a same magnetic field direction as described herein.

Preferably, the one or more pole pieces (x33) described herein are loop-shaped pole pieces (x33). Preferably, the one or more pole pieces (x33), preferably the one or more loop-shaped pole pieces (x33), are disposed within the loop-shaped magnetic-field generating device (x31) or within the combination of dipole magnets disposed in a loop-shaped arrangement. The one or more pole pieces (x33), preferably the one or more loop-shaped pole pieces (x33), may be disposed symmetrically within the loop of the loop-shaped magnetic-field generating device (x31) (as shown in FIGS. 2A and 6A) or may be disposed non-symmetrically within the loop of the loop-shaped magnetic-field generating device (x31). A pole piece denotes a structure composed of a soft magnetic material. Soft magnetic materials have a low coercivity and a high saturation. Suitable low-coercivity, high-saturation materials have a coercivity lower than 1000 A·m$^{-1}$, to allow for a fast magnetization and demagnetization, and their saturation is preferably at least 0.1 Tesla, more preferably at least 1.0 Tesla, and even more preferably at least 2 Tesla. The low-coercivity, high-saturation materials described herein include without limitation soft magnetic iron (from annealed iron and carbonyl iron), nickel, cobalt, soft ferrites like manganese-zinc ferrite or nickel-zinc ferrite, nickel-iron alloys (like permalloy-type materials), cobalt-iron alloys, silicon iron and amorphous metal alloys like Metglas® (iron-boron alloy), preferably pure iron and silicon iron (electrical steel), as well as cobalt-iron and nickel-iron alloys (permalloy-type materials). The pole piece serves to direct the magnetic field produced by a magnet.

According to one embodiment, the magnetic-field generating device (x30) described herein comprises the loop-shaped magnetic-field generating device (x31) described herein and the single dipole magnet (x32) or the two or more dipole magnets (x32) described herein. The single dipole magnet or two or more dipole magnets (x32) are disposed within the loop-shaped dipole magnet (x31) or within the combination of dipole magnets disposed in the loop-shaped arrangement. The single dipole magnet (x32) or two or more dipole magnets (x32) may be disposed symmetrically within the loop of the loop-shaped magnetic-field generating device (x31) or may be disposed non-symmetrically within the loop of the loop-shaped dipole magnet (x31).

According to another embodiment, the magnetic-field generating device (x30) described herein comprises the loop-shaped magnetic-field generating device (x31) described herein and the one or more pole pieces (x33), preferably one or more loop-shaped pole pieces (x33), described herein. The one or more pole pieces (x33), preferably one or more loop-shaped pole pieces (x33), are preferably independently disposed within the loop-shaped dipole magnet (x31) or within the combination of dipole magnets disposed in the loop-shaped arrangement.

According to another embodiment, the magnetic-field generating device (x30) described herein comprises the loop-shaped magnetic-field generating device (x31) described herein, the single dipole magnet (x32) or the two or more dipole magnets (x32) described herein and the one or more pole pieces (x33), preferably the one or more loop-shaped pole pieces (x33), described herein. The single dipole magnet (x32) or the two or more dipole magnets (x32) as well as the one or more pole pieces (x33), preferably the one or more loop-shaped pole pieces (x33), described herein are independently disposed within the loop-shaped dipole magnet (x31) or within the combination of dipole magnets disposed in the loop-shaped arrangement. The single dipole magnet (x32) and the one or more one or more pole pieces (x33), preferably the one or more loop-shaped pole pieces (x33), described herein, may be independently disposed symmetrically or non-symmetrically within the loop of the loop-shaped magnetic-field generating device (x31).

The magnetic-field generating device (x30) may be placed on top of the magnetic-field generating device (x40) or alternatively, the magnetic-field generating device (x40) may be placed on top of the loop-shaped magnetic-field generating device (x30). Preferably, the magnetic-field generating device (x30) is placed on top of the magnetic-field generating device (x40).

The distance (d) between the magnetic-field generating device (x30) and the magnetic-field generating device (x40) may be comprised in the range comprised between about 0 and about 10 mm, preferably between about 0 and about 3 mm.

Third Embodiment of Magnetic Assemblies (x00-*a*, x00-*b*

According to a third embodiment, the magnetic assemblies (x00-*a*, x00-*b*) for producing the OELs (x20) described herein on the substrates (x10) described herein comprises
i) the magnetic-field generating device (x30) comprising
   i-1) the supporting matrix (x34) described herein, i-2) the loop-shaped magnetic-field generating device (x31) being either the single loop-shaped magnet or the combination of two or more dipole magnets disposed in the loop-shaped arrangement, the loop-shaped magnetic-field generating device (x31) having a radial magnetization as described herein, and i-3) the single dipole magnet (x32) having a magnetic axis substantially perpendicular to the substrate (x10) surface, or the single dipole magnet (x32) having a magnetic axis substantially parallel to the substrate (x10) surface, or two or more dipole magnets (x32), each of said two or more dipole magnets (x32) having a magnetic axis substantially perpendicular to the substrate (x10) surface, wherein the North pole of said single dipole magnet (x32) or the North pole of at least one of said two or more dipole magnets (x32) is pointing towards the substrate (x10) surface when the North pole of the single loop-shaped magnet or of the two or more dipole magnets forming the loop-shaped magnetic-field generating device (x31) is pointing towards the periphery of said loop-shaped magnetic-field generating device (x31), or wherein the South pole of said single dipole magnet (x32) or the South pole of at least one of said two or more dipole magnets (x32) is pointing towards the substrate (x10) surface when the South pole of the single loop-shaped magnet or of the two or more dipole magnets forming the loop-shaped magnetic-field generating device (x31) is pointing towards the periphery of said loop-shaped magnetic-field generating device (x31) described herein,
ii) the magnetic-field generating device (x40) being either the single bar dipole magnet having a magnetic axis substantially parallel to the substrate (x10) surface or the combination of two or more bar dipole magnets (x41), each of the two or more bar dipole magnets (x41) having a magnetic axis substantially parallel to the substrate (x10) surface and having a same magnetic field direction described herein.

According to one embodiment, the magnetic assemblies (x00-a, x00-b) comprises the magnetic-field generating device (x30) described herein, the magnetic-field generating device (x40) described herein and the more one or more pole pieces (x50) described herein, preferably made of the materials described herein for the one or more pole pieces (x33). The one or more pole pieces (x50) may be loop-shaped pole pieces or solid-shaped pole pieces (i.e. pole pieces which do not comprise a central area lacking the material of said pole pieces), preferably solid-shaped pole pieces and more preferably disc-shaped pole pieces.

According to one embodiment, the loop-shaped magnetic-field generating device (x31) is a single loop-shaped magnet having a magnetic axis substantially parallel to the substrate (x10) surface and having a radial direction, i.e. having its magnetic axis directed from the central area of the loop of the loop-shaped magnet to the periphery when viewed from the top (i.e. from the side of the substrate (x10)) or in other words having its North Pole or South pole pointing radially towards the central area of the loop of the loop-shaped dipole magnet. According to a preferred embodiment, the loop-shaped magnetic-field generating device (x31) is a combination of two or more dipole magnets disposed in a loop-shaped arrangement such as described herein, the loop-shaped magnetic-field generating device (x31) having a radial magnetization, i.e. each dipole magnet having its magnetic axis directed from the central area of the loop of the loop-shaped magnet to the periphery when viewed from the top (i.e. from the side of the substrate (x10)) or in other words having its North Pole or South pole pointing radially towards the central area of the loop of the loop-shaped dipole magnet.

Preferably, the magnetic-field generating device (x30) described herein comprises the single dipole magnet (x32), wherein said single dipole magnet has a magnetic axis substantially perpendicular to the substrate (x10) surface and has its North pole pointing towards the substrate (x10) surface when the North pole of the single loop-shaped magnet or of the two or more dipole magnets forming the loop-shaped magnetic-field generating device (x31) is pointing towards the periphery of said loop-shaped magnetic-field generating device (x31), or having its South pole pointing towards the substrate (x10) surface when the South pole of the single loop-shaped magnet or of the two or more dipole magnets forming the loop-shaped magnetic-field generating device (x31) is pointing towards the periphery of said loop-shaped magnetic-field generating device (x31) or comprises the two or more dipole magnets (x32), wherein said two or more dipole magnets (x32) have a magnetic axis substantially perpendicular to the substrate (x10) surface and wherein the North pole of at least one of said two or more dipole magnets (x32) is pointing towards the substrate (x10) surface when the North pole of the single loop-shaped magnet or of the two or more dipole magnets forming the loop-shaped magnetic-field generating device (x31) is pointing towards the periphery of said loop-shaped magnetic-field generating device (x31), or wherein the South pole of at least one of said two or more dipole magnets (x32) is pointing towards the substrate (x10) surface when the South pole of the single loop-shaped magnet or of the two or more dipole magnets forming the loop-shaped magnetic-field generating device (x31) is pointing towards the periphery of said loop-shaped magnetic-field generating device (x31) as described herein.

According to one embodiment, the magnetic-field generating device (x30) described herein comprises the loop-shaped magnetic-field generating device (x31) described herein and the single dipole magnet (x32) or two or more dipole magnets (x32) described herein. The single dipole magnet or the two or more dipole magnets (x32) are disposed within the loop-shaped dipole magnet (x31) or within the combination of dipole magnets disposed in the loop-shaped arrangement. The single dipole magnet (x32) or two or more dipole magnets (x32) may be disposed symmetrically within the loop of the loop-shaped magnetic-field generating device (x31) or may be disposed non-symmetrically within the loop of the loop-shaped magnetic-field generating device (x31).

The magnetic-field generating (x30) and the magnetic-field generating device (x40) may be arranged one on top of the other. Preferably, the magnetic-field generating (x40) is arranged on top of the magnetic-field generating (x30). When the one or more one or more pole pieces (x50) described herein are comprised in the magnetic assemblies (x00-a, x00-b), the magnetic-field generating (x30) is preferably arranged on top of the one or more pole pieces (x50) (see for example FIG. 4). The distance (e) between the bottom surface of magnetic-field generating (x30) and the top surface of the one or more pole pieces (x50) may be comprised in the range comprised between about 0 and about 5 mm, preferably between about 0 and about 1 mm.

The supporting matrix (x34) may hold the single dipole magnet (x32) or the two or more dipole magnets (x32) within the loop defined by, and in spaced relation to, the single loop-shaped dipole magnet or within the loop defined by, and in spaced relation to, the two or more dipole magnets in the loop-shaped arrangement of the loop-shaped magnetic-field generating device (x31).

The distance (d) between the magnetic-field generating device (x30) and the magnetic-field generating device (x40) may be comprised in the range comprised between about 0 and about 10 mm, preferably between about 0 and about 3 mm.

According to one embodiment shown in FIG. 3A-B, the magnetic assemblies (x00-a, x00-b) for producing the OELs (x20) described herein the substrates (x10) described herein comprises i) a magnetic-field generating device (x30) comprising i-1) the supporting matrix (x34) described herein, i-2) the loop-shaped magnetic-field generating device (x31) being the combination of two or more, in particular four, dipole magnets disposed in a loop-shaped, in particular a square-shaped, arrangement, the loop-shaped magnetic-field generating device (x31) having a radial magnetization such as described herein; and i-3) two or more dipole magnets (x32), each of said two or more dipole magnets (x32) having a magnetic axis substantially perpendicular to the substrate (x10) surface, wherein the North pole of said single dipole magnet (x32) or the North pole of at least one of said two or more dipole magnets (x32) is pointing towards the substrate (x10) surface when the North pole of the two or more dipole magnets forming the loop-shaped magnetic-field generating device (x31) is pointing towards the periphery of said loop-shaped magnetic-field generating device (x31), or wherein the South pole of said single dipole magnet (x32) or the South pole of at least one of said two or more dipole magnets (x32) is pointing towards the substrate (x10) surface when the South pole of the two or more dipole magnets forming the loop-shaped magnetic-field generating device (x31) is pointing towards the periphery of said loop-shaped magnetic-field generating device (x31) as described herein, and ii) the magnetic-field generating device (x40) being the single bar dipole magnet having a magnetic axis substantially parallel to the substrate (x10) surface such as described herein, wherein the magnetic-field generating device (x40) is preferably arranged on top of the magnetic-field generating device (x30).

FIG. 3A-B illustrates an example of a magnetic assembly (300-a, 300-b) suitable for the first orientation step (step b)) or the second orientation step (step e)) described herein, said magnetic assembly (300-a, 300-b) comprising a magnetic-field generating device (330) and a magnetic-field generating device (340).

The magnetic assembly (300-a, 300-b) of FIG. 3A comprises a magnetic-field generating device (340) being the single bar dipole magnet, said magnetic-field generating device (340) being disposed on top of the magnetic-field generating device (330). The magnetic-field generating device (340) may be a parallelepiped having a length (B1), a width (B2) and a thickness (B3) as shown in FIG. 3A. The magnetic axis of the magnetic-field generating device (340) is substantially parallel to the substrate (310) surface.

The magnetic-field generating device (330) of FIG. 3A comprises the supporting matrix (334) which may be a parallelepiped having a length (A4), a width (A5) and a thickness (A6) as shown in FIG. 3A.

The magnetic-field generating device (330) of FIG. 3A comprises the loop-shaped magnetic-field generating device (331) being a combination of four dipole magnets disposed in a square-shaped arrangement and a combination of two or more, in particular eight, dipole magnets (332).

Each one of the four dipole magnets forming the loop-shaped magnetic-field generating device (331) being a square-shaped magnetic device may be a parallelepiped having a length (A1), a width (A2) and a thickness (A3) as shown in FIG. 3A. Each one of said four dipole magnets has a magnetic axis substantially parallel to the substrate (310) surface and each has its North pole pointing radially towards the central area of the loop of the square-shaped arrangement (331) and its South pole pointing towards the exterior of the supporting matrix (334).

Each of the two or more, in particular eight, dipole magnets (332) of the combination has a diameter (A7) and a thickness (A8) and has a magnetic axis substantially perpendicular to the magnetic axis of the magnetic-field generating device (340), i.e. substantially perpendicular to the substrate (310) surface with the South pole facing the substrate (310).

The magnetic-field generating device (330) and the magnetic-field generating device (340) being a single bar dipole magnet are preferably in direct contact, i.e. the distance (d) between the top surface of the magnetic-field generating device (330) and the bottom surface of the magnetic-field generating device (340) is about 0 mm (not shown true to scale in FIG. 3A for the clarity of the drawing). The distance between the top surface of the magnetic-field generating device (340) and the surface of the substrate (310) facing said magnetic-field generating device (340) is illustrated by the distance (h). Preferably, the distance (h) is between about 0.1 and about 10 mm and more preferably between about 0.2 and about 5 mm.

Figure 4A:
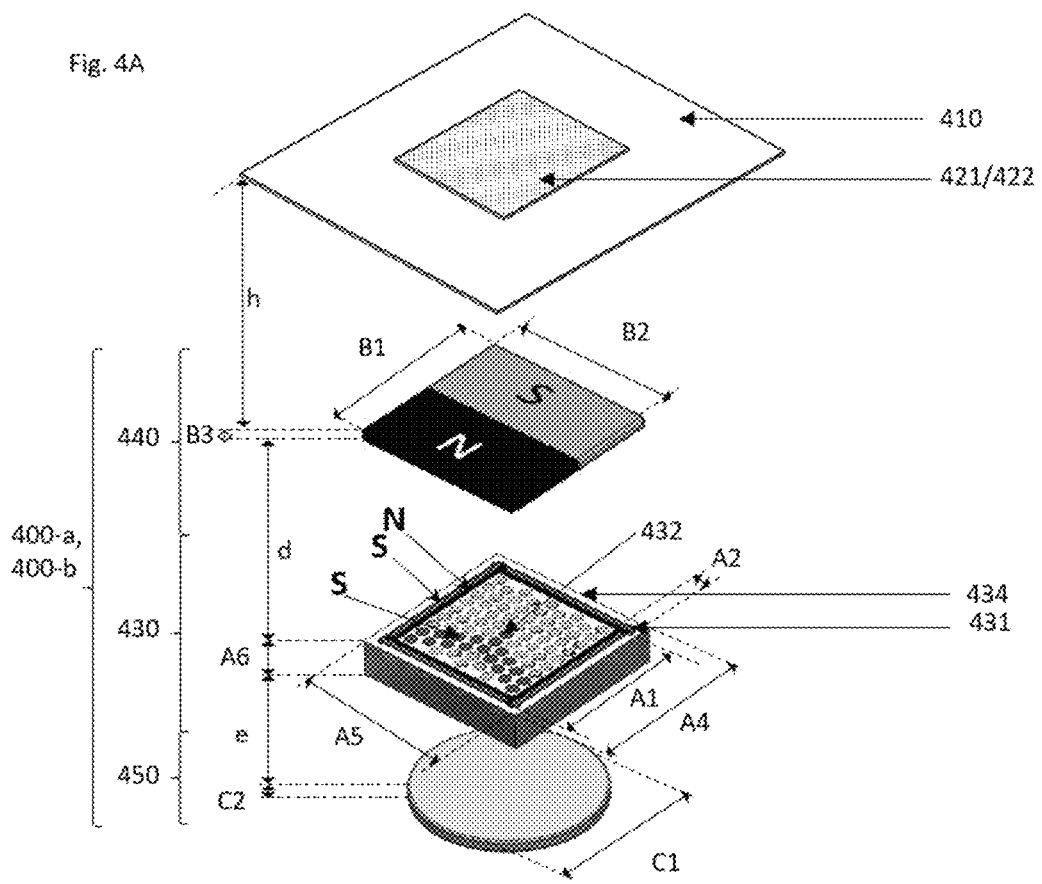

According to another embodiment shown in FIG. 4A-B, the magnetic assemblies (x00-a, x00-b) for producing the OELs (x20) described herein on the substrates (x10) described herein comprises i) the magnetic-field generating device (x30) comprising the supporting matrix (x34) described herein, the loop-shaped magnetic-field generating device (x31) being a combination of two or more, in particular four, dipole magnets disposed in a loop-shaped, in particular a square-shaped, arrangement, the loop-shaped magnetic-field generating device (x31) having a radial magnetization described herein as described herein; the two or more dipole magnets (x32), each of said two or more dipole magnets (x32) having a magnetic axis substantially perpendicular to the substrate (x10) surface, wherein the North pole of said single dipole magnet (x32) or the North pole of at least one of said two or more dipole magnets (x32) is pointing towards the substrate (x10) surface when the North pole of the two or more dipole magnets forming the loop-shaped magnetic-field generating device (x31) is pointing towards the periphery of said loop-shaped magnetic-field generating device (x31), or wherein the South pole of said single dipole magnet (x32) or the South pole of at least one of said two or more dipole magnets (x32) is pointing towards the substrate (x10) surface when the South pole of the two or more dipole magnets forming the loop-shaped magnetic-field generating device (x31) is pointing towards the periphery of said loop-shaped magnetic-field generating device (x31) as described herein, ii) the magnetic-field generating device (x40) being the single bar dipole magnet having a magnetic axis substantially parallel to the substrate (x10) surface described herein and iii) the one or more pole pieces (x50) described herein, wherein the magnetic-field generating (x40) is preferably arranged on top of the magnetic-field generating (x30) and wherein the magnetic-field generating (x30) is arranged on top of the one or more pole pieces (x50).

FIG. 4A-B illustrates an example of a magnetic assembly (400-a, 400-b) suitable for the first orientation step (step b)) or the second orientation step (step e)) described herein, said magnetic assembly (400-a, 400-b) comprising a magnetic-field generating device (430), a magnetic-field generating device (440) and one or more pole pieces (450).

The magnetic assembly (400-a, 400-b) of FIG. 4A comprises a magnetic-field generating device (440) being the single bar dipole magnet, said magnetic-field generating device (440) being disposed on top of the magnetic-field generating device (430). The magnetic-field generating device (440) may be a parallelepiped having a length (B1), a width (B2) and a thickness (B3) as shown in FIG. 4A. The magnetic axis of the magnetic-field generating device (440) is substantially parallel to the substrate (410) surface.

The magnetic-field generating device (430) of FIG. 4A comprises the supporting matrix (434) which may be a parallelepiped having a length (A4), a width (A5) and a thickness (A6) as shown in FIG. 4A.

The magnetic-field generating device (430) of FIG. 4A comprises the loop-shaped magnetic-field generating device (431) being a combination of four dipole magnets disposed in a square-shaped arrangement and a combination of two or more, in particular nineteen, dipole magnets (432).

Each one of the four dipole magnets forming the loop-shaped magnetic-field generating device (431) being a square-shaped magnetic device may be a parallelepiped having a length (A1), a width (A2) and a thickness (A3) as shown in FIG. 4A. Each one of said four dipole magnets has a magnetic axis substantially parallel to the substrate (410) surface and each has its North pole pointing radially towards the central area of the loop of the square-shaped arrangement (431) and its South pole pointing towards the exterior of the supporting matrix (434).

Each of the two or more, in particular nineteen, dipole magnets (432) of the combination has a length (A8) and a diameter (A7) and has a magnetic axis substantially perpendicular to the magnetic axis of the magnetic-field generating device (440), i.e. substantially perpendicular to the substrate (410) surface with the South pole facing the substrate (410).

The magnetic assembly (400-*a*, 400-*b*) of FIG. 4A comprises the one or more pole pieces (450), in particular one disc-shaped pole piece (450), having a diameter (C1) and a thickness (C2), wherein the magnetic-field generating device (430) is arranged on top of the one or more pole pieces (450).

The magnetic-field generating device (430) and the magnetic-field generating device (440) being the single bar dipole magnet are preferably in direct contact, i.e. the distance (d) between the top surface of the magnetic-field generating device (430) and the bottom surface of the magnetic-field generating device (440) is about 0 mm (not shown true to scale in FIG. 4A for the clarity of the drawing). The distance between the top surface of the magnetic-field generating device (440) and the surface of the substrate (410) facing said magnetic-field generating device (440) is illustrated by the distance (h). Preferably, the distance (h) is between about 0.1 and about 10 mm and more preferably between about 0.2 and about 5 mm.

The magnetic-field generating device (430) and the one or more pole pieces (450), in particular one disc-shaped pole piece (450) are preferably in direct contact, i.e. the distance (e) between the bottom surface of the supporting matrix (434) of the magnetic-field generating device (430) and the top surface of the disc-shaped pole piece (450) is about 0 mm (not shown true to scale in FIG. 4A for the clarity of the drawing).

The loop-shaped magnetic-field generating devices (x31) and the two or more dipole magnets (x31) disposed in a loop-shaped arrangement and comprised in the magnetic-field generating devices (x30) are preferably independently made of high-coercivity materials (also referred as strong magnetic materials). Suitable high-coercivity materials are materials having a maximum value of energy product $(BH)_{max}$ of at least 20 kJ/m$^3$, preferably at least 50 kJ/m$^3$, more preferably at least 100 kJ/m$^3$, even more preferably at least 200 kJ/m$^3$. They are preferably made of one or more sintered or polymer bonded magnetic materials selected from the group consisting of Alnicos such as for example Alnico 5 (R1-1-1), Alnico 5 DG (R1-1-2), Alnico 5-7 (R1-1-3), Alnico 6 (R1-1-4), Alnico 8 (R1-1-5), Alnico 8 HC (R1-1-7) and Alnico 9 (R1-1-6); hexaferrites of formula $MFe_{12}O_{19}$, (e.g. strontium hexaferrite ($SrO*6Fe_2O_3$) or barium hexaferrites ($BaO*6Fe_2O_3$)), hard ferrites of the formula $MFe_2O_4$ (e.g. as cobalt ferrite ($CoFe_2O_4$) or magnetite ($Fe_3O_4$)), wherein M is a bivalent metal ion), ceramic 8 (SI-1-5); rare earth magnetic materials selected from the group comprising $RECo_5$ (with RE=Sm or Pr), $RE_2TM_{17}$ (with RE=Sm, TM=Fe, Cu, Co, Zr, Hf), $RE_2TM_{14}B$ (with RE=Nd, Pr, Dy, TM=Fe, Co); anisotropic alloys of Fe Cr Co; materials selected from the group of PtCo, MnAlC, RE Cobalt 5/16, RE Cobalt 14. Preferably, the high-coercivity materials of the magnet bars are selected from the groups consisting of rare earth magnetic materials, and more preferably from the group consisting of $Nd_2Fe_{14}B$ and $SmCo_5$. Particularly preferred are easily workable permanent-magnetic composite materials that comprise a permanent-magnetic filler, such as strontium-hexaferrite ($SrFe_{12}O_{19}$) or neodymium-iron-boron ($Nd_2Fe_{14}B$) powder, in a plastic- or rubber-type matrix.

The single dipole magnets (x32) and the two or more dipole magnets (x32) of the magnetic-field generating device (x30) described herein are preferably independently made of strong magnetic materials such as those described hereabove for the loop-shaped magnets and the two or more dipole magnets of the loop-shaped magnetic-field generating device (x31).

The bar dipole magnets of the magnetic-field generating device (x40) are preferably made of strong magnetic materials such as those described hereabove for the materials of the loop-shaped magnets and the two or more dipole magnets of the loop-shaped magnetic-field generating device (x31).

The materials of the loop-shaped magnetic-field generating device (x31), the materials of the dipole magnets (x32), the materials of the one or more pole pieces (x33) when present, the materials of the magnetic-field generating device (x40), the materials of the two or more bar dipole magnets (x41), the materials of the one or more pole pieces (x50) when present, and the distances (d) and (h) and (e) are selected such that the magnetic field resulting from the interaction of the magnetic field produced by the magnetic-field generating device (x30) and the magnetic field produced by the magnetic-field generating device (x40), i.e. the resulting magnetic field of the apparatuses described herein, is suitable for producing the required magnetic orientations, i.e. both the magnetic orientation pattern of the particles in the first radiation curable coating compositions and the magnetic orientation pattern of the particles in the second radiation curable coating compositions, to produce an optical impression of one or more loop-shaped bodies having a size that varies upon tilting the optical effect layer (x10).

The first magnetic assembly (x00-*a*) and/or the second magnetic assembly (x00-*b*) for producing the OEL (x20) described herein may further comprise an engraved magnetic plate, such as those disclosed for example in WO 2005/002866 A1 and WO 2008/046702 A1. The engraved magnetic plate is located between the magnetic-field generating device (x30) or the magnetic-field generating device (x40) and the substrate (x10) surface, so as to locally modify the magnetic field of the magnetic assembly (x00-*a*, x00-*b*). Such an engraved plate may be made from iron (iron yokes). Alternatively, such an engraved plate may be made from a plastic material such as those described herein in which magnetic particles are dispersed (such as for example Plasto-ferrite).

As described herein, the process for producing the optical effect layer (OEL) (x20) described herein and providing the optical impression of a loop-shaped body having a size and a shape that varies upon tilting the optical effect layer, comprises two independent magnetic orientation steps (step b) and step e)) so as to produce on the substrate (x10) described herein one or more first patterns made of the first coating layer (x21) described herein and one or more second patterns made of the patterns made of the second coating layer (x22) described herein, wherein the second coating layer (x22) is arranged at least partially on top of the first coating layer (x21). As mentioned herein, each of the two magnetic orientation steps (step b) and step e)) advantageously uses two different magnetic assemblies (x00-*a* and x00-*b*), wherein each of said magnetic assemblies (x00-*a* and x00-*b*) allows the production of optical effect layers exhibiting a loop-shaped body having a size that varies upon tilting said optical effect layers and the shape of said so-obtained loop-shaped body is different. The optical impression of the one or more loop-shaped bodies having a size and a shape that varies upon tilting said optical effect layer is obtained by using the combined specific magnetic orientation patterns obtained during steps b) and e) and fixed/frozen during step c) and f)).

The two magnets of the magnetic-field generating devices (x40), one being used during the first magnetic orientation step (b)) in the first magnetic assembly (x00-*a*) and the other being used during the second magnetic orientation step (e)) in the second magnetic assembly (x00-*b*) are required to have an opposite magnetic direction, i.e. the magnetic direction of the magnetic-field generating device (x40) of the first magnetic assembly (x00-*a*) is opposite to the magnetic direction of the magnetic-field generating device (x40) of the second magnetic assembly (x00-*b*) within the reference frame of the substrate (x10).

The process for producing the OEL (x20) described herein on the substrate (x10) described herein, comprises the step b) of exposing the first radiation curable coating composition to the magnetic field of the first magnetic assembly (x00-*a*) described herein and comprises the step e) of exposing the second radiation curable coating composition to the magnetic field of the second magnetic assembly (x00-*b*) described herein, wherein said first and second magnetic assemblies (x00-*a*, x00-*b*) are different and wherein the magnetic direction of the magnetic-field generating device (x40) of the first magnetic assembly (x00-*a*) is opposite to the magnetic direction of the magnetic-field generating device (x40) of the second magnetic assembly (x00-*b*) within the reference frame of the substrate (x10), wherein the steps c) (at least partial curing of the first radiation curable coating composition) and d) (application of the second radiation curable coating composition) are carried out between said steps b) and e). According to one embodiment, the process for producing the OEL (x20) described herein on the substrate (x10) described herein, comprises i) a step of exposing the first radiation curable coating composition to the magnetic field of the first magnetic assembly (x00-*a*), wherein said first magnetic assembly (x00-*a*) is selected from the assemblies described in the first embodiment described herein and ii) a step of exposing the second radiation curable coating composition to the magnetic field of the second magnetic assembly (x00-*b*), wherein said second magnetic assembly (x00-*b*) is selected from the assemblies described in the first embodiment described herein, wherein said magnetic assemblies (x00-*a*, x00-*b*) are different; or comprises i) a step of exposing the first radiation curable coating composition to the magnetic field of the first magnetic assembly (x00-*a*), wherein said first magnetic assembly (x00-*a*) is selected from the assemblies described in the first embodiment described herein and the i) a step of exposing the second radiation curable coating composition to the magnetic field of the second magnetic assembly (x00-*b*), wherein said second magnetic assembly (x00-*b*) is selected from the assemblies described in the second embodiment described herein; or comprises i) a step of exposing the first radiation curable coating composition to the magnetic field of the first magnetic assembly (x00-*a*), wherein said first magnetic assembly (x00-*a*) is selected from the assemblies described in the first embodiment described herein and the ii) a step of exposing the second radiation curable coating composition to the magnetic field of the second magnetic assembly (x00-*b*), wherein said second magnetic assembly (x00-*b*) is selected from the assemblies described in the third embodiment described herein.

According to another embodiment, the process for producing the OEL (x20) described herein on the substrate (x10) described herein, comprises i) a step of exposing the first radiation curable coating composition to the magnetic field of the first magnetic assembly (x00-*a*), wherein said first magnetic assembly (x00-*a*) is selected from the assemblies described in the second embodiment described herein and ii) a step of exposing the second radiation curable coating composition to the magnetic field of the second magnetic assembly (x00-*b*), wherein said second magnetic assembly (x00-*b*) is selected from the assemblies described in the first embodiment described herein; or comprises i) a step of exposing the first radiation curable coating composition to the magnetic field of the first magnetic assembly (x00-*a*), wherein said first magnetic assembly (x00-*a*) is selected from the assemblies described in the second embodiment described herein and the i) a step of exposing the second radiation curable coating composition to the magnetic field of the second magnetic assembly (x00-*b*), wherein said second magnetic assembly (x00-*b*) is selected from the assemblies described in the second embodiment described herein, wherein said magnetic assemblies (x00-*a*, x00-*b*) are different; or comprises i) a step of exposing the first radiation curable coating composition to the magnetic field of the first magnetic assembly (x00-*a*), wherein said first magnetic assembly (x00-*a*) is selected from the assemblies described in the second embodiment described herein and the ii) a step of exposing the second radiation curable coating composition to the magnetic field of the second magnetic assembly (x00-*b*), wherein said second magnetic assembly (x00-*b*) is selected from the assemblies described in the third embodiment described herein.

According to another embodiment, the process for producing the OEL (x20) described herein on the substrate (x10) described herein, comprises i) a step of exposing the first radiation curable coating composition to the magnetic field of the first magnetic assembly (x00-*a*), wherein said first magnetic assembly (x00-*a*) is selected from the assemblies described in the third embodiment described herein and ii) a step of exposing the second radiation curable coating composition to the magnetic field of the second magnetic assembly (x00-*b*), wherein said second magnetic assembly (x00-*b*) is selected from the assemblies described in the first embodiment described herein; or comprises i) a step of exposing the first radiation curable coating composition to the magnetic field of the first magnetic assembly (x00-*a*), wherein said first magnetic assembly (x00-*a*) is selected from the assemblies described in the third embodiment described herein and the i) a step of exposing the second radiation curable coating composition to the magnetic field of the second magnetic assembly (x00-*b*), wherein said second magnetic assembly (x00-*b*) is selected from the assemblies described in the second embodiment described herein; or comprises i) a step of exposing the first radiation curable coating composition to the magnetic field of the first magnetic assembly (x00-*a*), wherein said first magnetic assembly (x00-*a*) is selected from the assemblies described in the third embodiment described herein and the ii) a step of exposing the second radiation curable coating composition to the magnetic field of the second magnetic assembly (x00-*b*), wherein said second magnetic assembly (x00-*b*) is selected from the assemblies described in the third embodiment described herein, wherein said magnetic assemblies (x00-*a*, x00-*b*) are different.

According to a preferred embodiment, the process for producing the OEL (x20) described herein on the substrate (x10) described herein, comprises i) a step of exposing the first radiation curable coating composition to the magnetic field of the first magnetic assembly (x00-*a*), wherein said first magnetic assembly (x00-*a*) is selected from the assemblies described in the first embodiment described herein, i.e. a first magnetic assembly (x00-*a*) comprising i) the magnetic-field generating device (x30) comprising i-1) the supporting matrix (x34) described herein, i-2) the loop-shaped magnetic-field generating device (x31) being either the single loop-shaped dipole magnet having a magnetic axis substantially perpendicular to the substrate (x10) surface or the combination of two or more dipole magnets disposed in a loop-shaped arrangement, each of the two or more dipole magnets having a magnetic axis substantially perpendicular to the substrate (x10) surface and having a same magnetic field direction as described herein, optionally with i-3) the one or more pole pieces (x33) described herein, and ii) the magnetic-field generating device (x40) being either the single bar dipole magnet having a magnetic axis substantially parallel to the substrate (x10) surface or the combination of two or more bar dipole magnets (x41), each of the two or more bar dipole magnets (x41) having a magnetic axis substantially parallel to the substrate (x10) surface and having a same magnetic field direction as described herein, and ii) a step of exposing the second radiation curable coating composition to the magnetic field of the second magnetic assembly (x00-*b*), wherein said second magnetic assembly (x00-*b*) is selected from the assemblies described in the third embodiment described herein, i.e. a second magnetic assembly (x00-*b*) comprising i) a magnetic-field generating device (x30) comprising i-1) the supporting matrix (x34) described herein, i-2) the loop-shaped magnetic-field generating device (x31) being either the single loop-shaped magnet or the combination of two or more dipole magnets disposed in the loop-shaped arrangement, the loop-shaped magnetic-field generating device (x31) having a radial magnetization as described herein, and i-3) the single dipole magnet (x32) having a magnetic axis substantially perpendicular to the substrate (x10) surface, or the single dipole magnet (x32) having a magnetic axis substantially parallel to the substrate (x10) surface, or two or more dipole magnets (x32), each of said two or more dipole magnets (x32) having a magnetic axis substantially perpendicular to the substrate (x10) surface, wherein the North pole of said single dipole magnet (x32) or the North pole of at least one of said two or more dipole magnets (x32) is pointing towards the substrate (x10) surface when the North pole of the single loop-shaped magnet or of the two or more dipole magnets forming the loop-shaped magnetic-field generating device (x31) is pointing towards the periphery of said loop-shaped magnetic-field generating device (x31), or wherein the South pole of said single dipole magnet (x32) or the South pole of at least one of said two or more dipole magnets (x32) is pointing towards the substrate (x10) surface when the South pole of the single loop-shaped magnet or of the two or more dipole magnets forming the loop-shaped magnetic-field generating device (x31) is pointing towards the periphery of said loop-shaped magnetic-field generating device (x31) described herein, and ii) a magnetic-field generating device (x40) being either the single bar dipole magnet having a magnetic axis substantially parallel to the substrate (x10) surface or the combination of two or more bar dipole magnets (x41), each of the two or more bar dipole magnets (x41) having a magnetic axis substantially parallel to the substrate (x10) surface and having a same magnetic field direction, wherein said the magnetic-field generating device (x40) may further comprise one or more pole pieces (x50) such as those described herein.

Preferably, the step of exposing the first radiation curable coating composition to the magnetic field of the first magnetic assembly (x00-*a*) is carried out with the first magnetic assembly (x00-*a*) comprising the magnetic-field generating device (x30) comprising i-1) the supporting matrix (x34) described herein, i-2) the loop-shaped magnetic-field generating device (x31) described herein, preferably the single loop-shaped dipole magnet having a magnetic axis substantially perpendicular to the substrate (x10) surface described herein, and i-3) the one or more pole pieces (x33), preferably the one or more loop-shaped pole pieces, wherein said one or more pole pieces (x33) are independently disposed within the single loop-shaped dipole magnet (x31) or within the combination of dipole magnets disposed in a loop-shaped arrangement. More preferably and for example as shown in FIG. 2A-B and FIG. 5A-B, the step of exposing the first radiation curable coating composition to the magnetic field of the first magnetic assembly (x00-*a*) is carried out with the first magnetic assembly (x00-*a*) comprising i) the magnetic-field generating device (x30) such as those described herein and comprising i-1) the supporting matrix (x34) described herein, i-2) the loop-shaped magnetic-field generating device (x31) being the single loop-shaped, in particular the ring-shaped, dipole magnet described herein and having a magnetic axis substantially perpendicular to the substrate (x10) surface as described herein, and i-3) the one or more pole pieces (x33), in particular the one or more loop-shaped pole pieces described herein, wherein said one or more loop-shaped, in particular ring-shaped, pole pieces (X33) are disposed symmetrically within the loop of the loop-shaped magnetic-field generating device (x31) and ii) the magnetic-field generating device (x40) described herein and being the combination of two or more bar dipole magnets (x41) described herein, each of the two or more bar dipole magnets (x41) having a magnetic axis substantially parallel to the substrate (x10) surface and having a same magnetic field direction, wherein the two or more bar dipole magnets (x41) may be separated by the one or more spacer pieces (x42) described herein and wherein the magnetic-field generating device (x30) is placed on top of the magnetic-field generating device (x40).

Preferably, the step of exposing the second radiation curable coating composition to the magnetic field of the second magnetic assembly (x00-*b*) is carried out with the second magnetic assembly (x00-*b*) comprising the magnetic-field generating device (x30) comprising i-1) the supporting matrix (x34) described herein, i-2) the loop-shaped magnetic-field generating device (x31) being either the single loop-shaped magnet or the combination of two or more dipole magnets disposed in a loop-shaped arrangement, the loop-shaped magnetic-field generating device (x31) having a radial magnetization, a single dipole magnet (x32) having a magnetic axis substantially perpendicular to the substrate (x10) surface or two or more dipole magnets (x32), each of said two or more dipole magnets (x32) having a magnetic axis substantially perpendicular to the substrate (x10) surface such as described herein, wherein the North pole of said single dipole magnet (x32) or the North pole of at least one of said two or more dipole magnets (x32) is pointing towards the substrate (x10) surface when the North pole of the single loop-shaped magnet or of the two or more dipole magnets forming the loop-shaped magnetic-field generating device (x31) is pointing towards the periphery of said loop-shaped magnetic-field generating device (x31), or wherein the South pole of said single dipole magnet (x32) or the South pole of at least one of said two or more dipole magnets (x32) is pointing towards the substrate (x10) surface when the South pole of the single loop-shaped magnet or of the two or more dipole magnets forming the loop-shaped magnetic-field generating device (x31) is pointing towards the periphery of said loop-shaped magnetic-field generating device (x31), ii) the magnetic-field generating device (x40) being either the single bar dipole magnet having a magnetic axis substantially parallel to the substrate (x10) surface or the combination of two or more bar dipole magnets (x41), each of the two or more bar dipole magnets (x41) having a magnetic axis substantially parallel to the substrate (x10) surface and having a same magnetic field direction as described herein, iii) and optionally the one or more pole pieces (x50), preferably the one or more disc-shaped pole pieces (x50). More preferably and for example as shown in FIG. 3A-B or 4A-B, the step of exposing the second radiation curable coating composition to the magnetic field of the second magnetic assembly (x00-b) is carried out either with the second magnetic assembly (x00-b) comprising i) the magnetic-field generating device (x30) comprising i-1) the supporting matrix (x34) described herein, i-2) the loop-shaped magnetic-field generating device (x31) being the combination of two or more, in particular four, dipole magnets disposed in a loop-shaped, in particular a square-shaped, arrangement, the loop-shaped magnetic-field generating device (x31) having a radial magnetization such as described herein and i-3) two or more dipole magnets (x32), each of said two or more dipole magnets (x32) having a magnetic axis substantially perpendicular to the substrate (x10) surface, wherein the North pole of said single dipole magnet (x32) or the North pole of at least one of said two or more dipole magnets (x32) is pointing towards the substrate (x10) surface when the North pole of the two or more dipole magnets forming the loop-shaped magnetic-field generating device (x31) is pointing towards the periphery of said loop-shaped magnetic-field generating device (x31), or wherein the South pole of said single dipole magnet (x32) or the South pole of at least one of said two or more dipole magnets (x32) is pointing towards the substrate (x10) surface when the South pole of the two or more dipole magnets forming the loop-shaped magnetic-field generating device (x31) is pointing towards the periphery of said loop-shaped magnetic-field generating device (x31), and ii) the magnetic-field generating device (x40) being the single bar dipole magnet having a magnetic axis substantially parallel to the substrate (x10) surface such as described herein, wherein the magnetic-field generating device (x40) is preferably arranged on top of the magnetic-field generating device (x30), or with the second magnetic assembly (x00-b) comprising i) the magnetic-field generating device (x30) comprising i-1) the supporting matrix (x34) described herein, the loop-shaped magnetic-field generating device (x31) being the combination of two or more, in particular four, dipole magnets disposed in a loop-shaped, in particular a square-shaped, arrangement, the loop-shaped magnetic-field generating device (x31) having a radial magnetization such as described herein and i-3) the two or more dipole magnets (x32), each of said two or more dipole magnets (x32) having a magnetic axis substantially perpendicular to the substrate (x10) surface, wherein the North pole of said single dipole magnet (x32) or the North pole of at least one of said two or more dipole magnets (x32) is pointing towards the substrate (x10) surface when the North pole of the two or more dipole magnets forming the loop-shaped magnetic-field generating device (x31) is pointing towards the periphery of said loop-shaped magnetic-field generating device (x31), or wherein the South pole of said single dipole magnet (x32) or the South pole of at least one of said two or more dipole magnets (x32) is pointing towards the substrate (x10) surface when the South pole of the two or more dipole magnets forming the loop-shaped magnetic-field generating device (x31) is pointing towards the periphery of said loop-shaped magnetic-field generating device (x31), ii) the magnetic-field generating device (x40) being the single bar dipole magnet having a magnetic axis substantially parallel to the substrate (x10) surface such as those described herein and iii) the one or more pole pieces (x50) described herein, preferably the one or more disc-shaped pole pieces (x50) described herein, wherein the magnetic-field generating (x40) is preferably arranged on top of the magnetic-field generating (x30) and wherein the magnetic-field generating (x30) is arranged on top of the one or more pole pieces (x50).

According to another embodiment, the process for producing the OEL (x20) described herein on the substrate (x10) described herein, comprises i) a step of exposing the first radiation curable coating composition to the magnetic field of the first magnetic assembly (x00-a), wherein said first magnetic assembly (x00-a) is selected from the assemblies described in the third embodiment described herein, i.e. a first magnetic assembly (x00-a) and ii) a step of exposing the second radiation curable coating composition to the magnetic field of the second magnetic assembly (x00-b), wherein said second magnetic assembly (x00-b) is selected from the assemblies described in the third embodiment described herein, i.e. a first and second magnetic assemblies (x00-a, x00-b) independently comprising i) a magnetic-field generating device (x30) comprising i-1) the supporting matrix (x34) described herein, i-2) the loop-shaped magnetic-field generating device (x31) described herein being either the single loop-shaped magnet or the combination of two or more dipole magnets disposed in a loop-shaped arrangement, the loop-shaped magnetic-field generating device (x31) having a radial magnetization such as described herein, i-3) the single dipole magnet (x32) having a magnetic axis substantially perpendicular to the substrate (x10) surface, or the single dipole magnet (x32) having a magnetic axis substantially parallel to the substrate (x10) surface, or the two or more dipole magnets (x32), each of said two or more dipole magnets (x32) having a magnetic axis substantially perpendicular to the substrate (x10) surface, wherein the North pole of said single dipole magnet (x32) or the North pole of at least one of said two or more dipole magnets (x32) is pointing towards the substrate (x10) surface when the North pole of the single loop-shaped magnet or of the two or more dipole magnets forming the loop-shaped magnetic-field generating device (x31) is pointing towards the periphery of said loop-shaped magnetic-field generating device (x31), or wherein the South pole of said single dipole magnet (x32) or the South pole of at least one of said two or more dipole magnets (x32) is pointing towards the substrate (x10) surface when the South pole of the single loop-shaped magnet or of the two or more dipole magnets forming the loop-shaped magnetic-field generating device (x31) is pointing towards the periphery of said loop-shaped magnetic-field generating device (x31), and ii) the magnetic-field generating device (x40) described herein being either the single bar dipole magnet having a magnetic axis substantially parallel to the substrate (x10) surface or the combination of two or more bar dipole magnets (x41), each of the two or more bar dipole magnets (x41) having a magnetic axis substantially parallel to the substrate (x10) surface and having a same magnetic field direction, wherein first and second magnetic assemblies (x00-a, x00-b) are different.

Preferably and for example as shown in FIG. 3A-B, the step of exposing the second radiation curable coating composition to the magnetic field of the second magnetic assembly (x00-b) is carried out either with the second magnetic assembly (x00-b) comprising i) the magnetic-field generating device (x30) comprising i-1) the supporting matrix (x34) described herein, i-2) the loop-shaped magnetic-field generating device (x31) being the combination of two or more, in particular four, dipole magnets disposed in a loop-shaped, in particular a square-shaped, arrangement the loop-shaped magnetic-field generating device (x31) having a radial magnetization such as described herein and i-3) two or more dipole magnets (x32), each of said two or more dipole magnets (x32) having a magnetic axis substantially perpendicular to the substrate (x10) surface, wherein the North pole of said single dipole magnet (x32) or the North pole of at least one of said two or more dipole magnets (x32) is pointing towards the substrate (x10) surface when the North pole of the two or more dipole magnets forming the loop-shaped magnetic-field generating device (x31) is pointing towards the periphery of said loop-shaped magnetic-field generating device (x31), or wherein the South pole of said single dipole magnet (x32) or the South pole of at least one of said two or more dipole magnets (x32) is pointing towards the substrate (x10) surface when the South pole of the two or more dipole magnets forming the loop-shaped magnetic-field generating device (x31) is pointing towards the periphery of said loop-shaped magnetic-field generating device (x31), and ii) the magnetic-field generating device (x40) being the single bar dipole magnet having a magnetic axis substantially parallel to the substrate (x10) surface such as described herein, wherein the magnetic-field generating device (x40) is preferably arranged on top of the magnetic-field generating device (x30).

Preferably, the step of exposing the second radiation curable coating composition to the magnetic field of the second magnetic assembly (x00-b) is carried out with the second magnetic assembly (x00-b) comprising the magnetic-field generating device (x30) comprising i-1) the supporting matrix (x34) described herein, i-2) the loop-shaped magnetic-field generating device (x31) described herein being either the single loop-shaped magnet or the combination of two or more dipole magnets disposed in a loop-shaped arrangement, the loop-shaped magnetic-field generating device (x31) having a radial magnetization, and i-3) a single dipole magnet (x32) having a magnetic axis substantially perpendicular to the substrate (x10) surface, or a single dipole magnet (x32) having a magnetic axis substantially parallel to the substrate (x10) surface, or two or more dipole magnets (x32), each of said two or more dipole magnets (x32) having a magnetic axis substantially perpendicular to the substrate (x10) surface, wherein the North pole of said single dipole magnet (x32) or the North pole of at least one of said two or more dipole magnets (x32) is pointing towards the substrate (x10) surface when the North pole of the single loop-shaped magnet or of the two or more dipole magnets forming the loop-shaped magnetic-field generating device (x31) is pointing towards the periphery of said loop-shaped magnetic-field generating device (x31), or wherein the South pole of said single dipole magnet (x32) or the South pole of at least one of said two or more dipole magnets (x32) is pointing towards the substrate (x10) surface when the South pole of the single loop-shaped magnet or of the two or more dipole magnets forming the loop-shaped magnetic-field generating device (x31) is pointing towards the periphery of said loop-shaped magnetic-field generating device (x31), ii) the magnetic-field generating device (x40) described herein being either the single bar dipole magnet having a magnetic axis substantially parallel to the substrate (x10) surface or the combination of two or more bar dipole magnets (x41), each of the two or more bar dipole magnets (x41) having a magnetic axis substantially parallel to the substrate (x10) surface and having a same magnetic field direction and iii) the one or more pole pieces (x50) described herein, preferably the one or more disc-shaped pole pieces (x50) described herein. More preferably and for example as shown in FIG. 4A-B, the step of exposing the second radiation curable coating composition to the magnetic field of the second magnetic assembly (x00-b) is carried out with the second magnetic assembly (x00-b) comprising i) the magnetic-field generating device (x30) comprising i-1) the supporting matrix (x34) described herein, i-2) the loop-shaped magnetic-field generating device (x31) being the combination of two or more, in particular four, dipole magnets disposed in a loop-shaped, in particular a square-shaped, arrangement, the loop-shaped magnetic-field generating device (x31) having a radial magnetization such as described herein, and i-3) two or more dipole magnets (x32), each of said two or more dipole magnets (x32) having a magnetic axis substantially perpendicular to the substrate (x10) surface, wherein the North pole of said single dipole magnet (x32) or the North pole of at least one of said two or more dipole magnets (x32) is pointing towards the substrate (x10) surface when the North pole of the two or more dipole magnets forming the loop-shaped magnetic-field generating device (x31) is pointing towards the periphery of said loop-shaped magnetic-field generating device (x31), or wherein the South pole of said single dipole magnet (x32) or the South pole of at least one of said two or more dipole magnets (x32) is pointing towards the substrate (x10) surface when the South pole of the two or more dipole magnets forming the loop-shaped magnetic-field generating device (x31) is pointing towards the periphery of said loop-shaped magnetic-field generating device (x31), ii) the magnetic-field generating device (x40) described herein being the single bar dipole magnet having a magnetic axis substantially parallel to the substrate (x10) surface such as those described herein and iii) the one or more pole pieces (x50), preferably the one or more disc-shaped pole pieces, wherein the magnetic-field generating device (x40) is preferably arranged on top of the magnetic-field generating device (x30).

The OEL (x20) described herein may be provided directly on a substrate (x10) on which it shall remain permanently (such as for banknote applications). Alternatively, the OEL (x20) may also be provided on a temporary substrate (x10) for production purposes, from which the OEL (x20) is subsequently removed. This may for example facilitate the production of the OEL (x20), particularly while the binder material is still in its fluid state. Thereafter, after at least partially curing the coating composition for the production of the OEL (x20), the temporary substrate (x10) may be removed from the OEL.

Alternatively, an adhesive layer may be present on the OEL (x20) or may be present on the substrate (x10) comprising the OEL (x20), said adhesive layer being on the side of the substrate opposite the side where the OEL (x20) is provided or on the same side as the OEL (x20) and on top of the OEL (x20). Therefore an adhesive layer may be applied to the OEL (x20) or to the substrate (x10). Such an article may be attached to all kinds of documents or other articles or items without printing or other processes involving machinery and rather high effort. Alternatively, the substrate (x10) described herein comprising the OEL (x20) described herein may be in the form of a transfer foil, which can be applied to a document or to an article in a separate transfer step. For this purpose, the substrate is provided with a release coating, on which the OEL (x20) are produced as described herein. One or more adhesive layers may be applied over the so produced OEL (x20).

Also described herein are substrates (x10) comprising more than one, i.e. two, three, four, etc. optical effect layers (OEL) (x20) obtained by the process described herein.

Also described herein are articles, in particular security documents, decorative elements or objects, comprising the optical effect layer (OEL) (x20) produced according to the present invention. The articles, in particular security documents, decorative elements or objects, may comprise more than one (for example two, three, etc.) OELs (x20) produced according to the present invention.

As mentioned hereabove, the optical effect layer (OEL) (x20) produced according to the present invention may be used for decorative purposes as well as for protecting and authenticating a security document. Typical examples of decorative elements or objects include without limitation luxury goods, cosmetic packaging, automotive parts, electronic/electrical appliances, furniture and fingernail lacquers.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the OEL (x20) described herein may be produced onto an auxiliary substrate (x10) such as for example a security thread, security stripe, a foil, a decal, a window or a label and consequently transferred to a security document in a separate step.

EXAMPLES

Figure 4A:
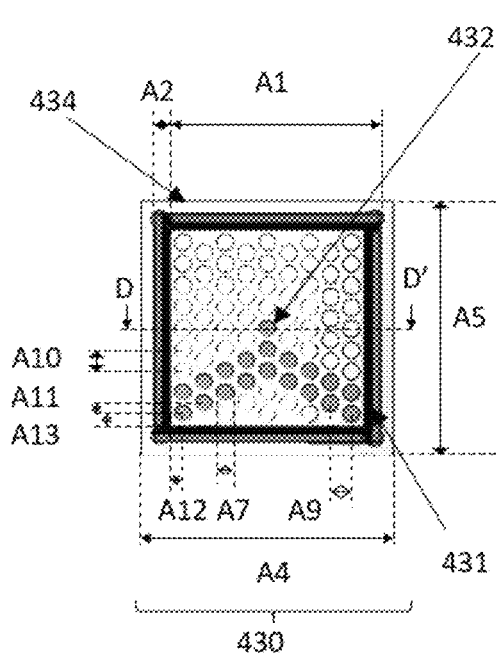
Figure 4A:
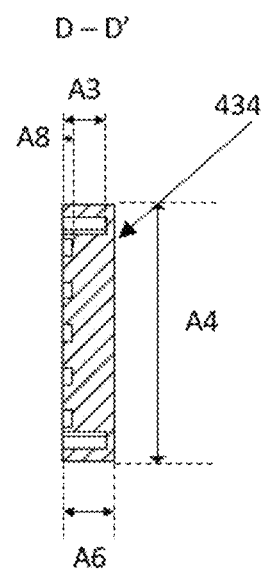

Magnetic assemblies depicted in FIG. 2-4 were used in independent magnetic orientation steps of non-spherical optically variable magnetic pigment particles in a printed layer of the UV-curable screen printing ink described in Table 1 so as to produce the optical effect layers (OELs) (x20) shown in FIG. 6A-C and prepared according to the invention. Magnetic assemblies depicted in FIGS. 4 and 5 were used to orient non-spherical optically variable magnetic pigment particles in a printed layer of the UV-curable screen printing ink described in Table 1 so as to produce a comparative optical effect layer (OEL) (720) shown in FIG. 7.

General Process for the Preparation of the Example E1-E3 and Comparative Example C1

The UV-curable screen printing ink described in Table 1 was independently applied (step a)) onto a black commercial paper substrate (x10) (a fiduciary standard paper BNP 90 g/m$^2$, from Papierfabrik Louisenthal, 50×50 mm), said application being carried out by hand screen printing using a T90 screen so as to form a first single pattern of a first coating layer (x21) (16 mm×16 mm) having a thickness of about 20 µm. The paper substrate (x10) carrying the applied single pattern of the first coating layer (x21) was independently disposed on a first magnetic assembly (x00-a) (FIGS. 2 and 5) (step b)). The so-obtained magnetic orientation pattern of the non-spherical optically variable pigment particles was, partially simultaneously to the orientation step, at least partially cured by UV-curing (step c)) the printed layer comprising the pigment particles using a UV-LED-lamp from Phoseon (Type FireFlex 50×75 mm, 395 nm, 8 W/cm$^2$). The same UV-curable screen printing ink (Table 1) was independently applied (step d)) by hand on top of the first single pattern of the first coating layer (x21) using the T90 silkscreen so as to form a second pattern made of a second coating layer (x22) (16 mm×16 mm for E1-E2 (FIGS. 6A-B) and C1 (FIG. 7); 10 mm×10 mm for E3 (FIG. 6C)) having a thickness of about 20 µm. The paper substrate (x10) carrying the first pattern made of the first hardened coating layer (x21) and the not yet hardened second pattern made of the coating layer (x22) was independently disposed on a second magnetic assembly (x00-b) (FIG. 3-4) different from the first magnetic assembly (x00-a) (step e)). The so-obtained magnetic orientation pattern of the non-spherical optically variable pigment particles was independently, partially simultaneously to the second orientation step at least partially cured (step f)) by UV-curing the printed layer comprising the pigment particles using a UV-LED-lamp from Phoseon (Type FireFlex 50×75 mm, 395 nm, 8 W/cm$^2$).

TABLE 1

| UV-curable screen printing ink: | |
| --- | --- |
| Epoxyacrylate oligomer | 36% |
| Trimethylolpropane triacrylate monomer | 13.5% |
| Tripropyleneglycol diacrylate monomer | 20% |
| Genorad ™ 16 (Rahn) | 1% |
| Aerosil ® 200 (Evonik) | 1% |
| Speedcure TPO-L (Lambson) | 2% |
| IRGACURE ® 500 (BASF) | 6% |
| Genocure EPD (Rahn) | 2% |
| Tego ® Foamex N (Evonik) | 2% |
| Non-spherical optically variable magnetic pigment particles (7 layers)(*) | 16.5% |

(*)gold-to-green optically variable magnetic pigment particles having a flake shape of diameter d50 about 9 µm and thickness about 1 µm, obtained from Viavi Solutions, Santa Rosa, CA.

Description of the First and Second Magnetic Assemblies (x00-a, x100-b) (FIG. 2-5) Magnetic Assembly (200-a, 200-b) (FIG. 2A-2B)

The magnetic assembly (200-a, 200-b) (FIG. 2A-2B) comprised a magnetic-field-generating device (230) being disposed between a magnetic-field-generating device (240)

and a substrate (210) carrying the coating composition (221, 221+222) comprising the non-spherical magnetic or magnetizable pigment particles as illustrated schematically in FIG. 2A.

The magnetic-field-generating device (230) comprised a ring-shaped dipole magnet (231), a ring-shaped pole piece (233) and a square-shaped supporting matrix (234) to maintain the ring-shaped dipole magnet (231) and the ring-shaped pole piece (233) in position.

The ring-shaped dipole magnet (231) had an external diameter (A1) of about 26.1 mm, an internal diameter (A2) of about 18.3 mm and a thickness (A5) of about 2 mm. The ring-shaped dipole magnet (231) had a magnetic axis substantially perpendicular to the magnetic axis of the magnetic-field-generating device (240) and substantially perpendicular to the substrate (210) surface, with the South Pole pointing towards the substrate (210). The ring-shaped dipole magnet (231) was made of NdFeB N40.

The ring-shaped pole piece (233) had an external diameter (A3) of about 14 mm, an internal diameter (A4) of about 10 mm and a thickness (A5) of about 2 mm. The ring-shaped pole piece (233) was centrally aligned with the ring-shaped magnetic-field-generating device (231). The ring-shaped pole piece (233) was made of steel S235.

The supporting matrix (234) had a length (A6) and a width (A7) of about 29.9 mm and a thickness (A8) of about 3 mm. The supporting matrix (234) was made of POM. As shown in FIG. 2B2, the bottom surface of the supporting matrix (234) comprised two circular indentations having a depth (A5) of about 2 mm for receiving the ring-shaped dipole magnet (231) and the ring-shaped pole piece (233).

The magnetic-field-generating device (240) comprised seven bar dipole magnets (241) and six spacer pieces (242). The seven bar dipole magnets (241) and the six spacer pieces (242) were disposed in an alternating non-symmetrical manner as shown in FIG. 2A, i.e. two bar dipole magnets (241) were in direct contact and adjacent to a spacer piece (242), the other five bar dipole magnets being each alternated with a spacer piece (242). The sixth spacer piece (242) was used to ensure the right positioning of the magnetic-field-generating device (240) below the magnetic-field-generating device (230). The seven bar dipole magnets (241) had each a length (B1) of about 29.9 mm, a width (B2) of about 3 mm and a thickness (B3) of about 6 mm. Each of the six spacer pieces (242) had a length (B4) of about 20 mm, a width (B5) of about 1.5 mm and a thickness (B6) of about 6 mm. The magnetic axis of each of the seven bar dipole magnets (241) was substantially parallel to the substrate (210) surface and pointing all in the same direction. The seven bar dipole magnets (241) were made of NdFeB N42. The six spacer pieces (242) were made of POM.

The magnetic-field-generating device (230) and the magnetic-field-generating device (240) were in direct contact, i.e. the distance (d) between the bottom surface of the magnetic-field-generating device (230) and the top surface of the magnetic-field-generating device (240) was about 0 mm (not shown true to scale in FIG. 2A for the clarity of the drawing). The magnetic-field-generating device (230) and the magnetic-field-generating device (240) were centrally aligned relative to each other, i.e. the midsection of the length (A6) and of the width (A7) of the magnetic-field-generating device (230) was aligned with the midsection of the length (B1) and of the width (B7) of the magnetic-field-generating device (240). The distance (h) between the top surface of the magnetic-field-generating device (230) (i.e. the top surface of the supporting matrix (234) and the surface of the substrate (210) facing the magnetic-field-generating device (230) was about 3.5 mm.

Magnetic Assembly (300-a, 300-b) (FIG. 3A-3B)

The magnetic-field-generating assembly (300-a, 300-b) (FIG. 3A-3B) comprised a magnetic-field-generating device (340) being disposed between a magnetic-field-generating device (330) and a substrate (310) carrying the coating composition (321, 321+322) comprising the non-spherical magnetic or magnetizable pigment particles as illustrated schematically in FIG. 3A.

The magnetic-field-generating device (330) comprised four bar dipole magnets (331) disposed in a square-shaped arrangement, eight dipole magnets (332) and a supporting matrix (334). The eight dipole magnets (332) were disposed in the corners of a first square and a second square, respectively, wherein the first square was nested into the second square and were centrally disposed within the square-shaped arrangement of the four bar dipole magnets (331) as illustrated schematically in FIGS. 3A and 3B.

As shown in FIGS. 3A and 3B, each of the four bar dipole magnets (331) disposed in the square-shaped arrangement had a length (A1) of about 25 mm, a width (A2) of about 2 mm and a thickness (A3) of about 5 mm. The four bar dipole magnets (331) disposed in the square-shaped arrangement were placed in such a way in the supporting matrix (334) that their magnetic axis was substantially parallel to the magnetic axis of the magnetic field-generating device (340) and substantially parallel to the substrate (310) surface, their North pole pointing radially towards the central area of the loop of the square-shaped arrangement, and their South pole pointing towards the exterior of the supporting matrix (334), i.e. pointing towards the environment. The center of the square formed by the four bar dipole magnets (331) disposed in the square-shaped arrangement coincided with the center of the supporting matrix (334). Each of the four bar dipole magnets (331) disposed in the square-shaped arrangement was made of NdFeB N48.

Each of the eight dipole magnets (332) had a diameter (A7) of about 2 mm and a thickness (A8) of about 4 mm. Four of said eight dipole magnets (332) were disposed in four indentations located on the diagonals around the center of the supporting matrix (334) such as to form the first square. The other four of the eight dipole magnets (332) were disposed in four indentations located on the diagonals of the supporting matrix (334) such as to form the second square as illustrated in FIG. 3B1. The magnetic axis of each of the eight dipole magnets (332) was substantially perpendicular to the substrate (310) surface and to the magnetic axis of the magnetic-field-generating device (340) with its South Pole pointing towards the magnetic-field-generating device (340). Each of the eight dipole magnets (332) was made of NdFeB N45.

The supporting matrix (334) had a length (A4) and a width (A5) of about 30 mm, and a thickness (A6) of about 6 mm. The supporting matrix (334) was made of POM. As shown in FIG. 3B1-2, the top surface of the supporting matrix (334) comprised thirty-six indentations, disposed in six lines comprising each six indentations, having a depth (A8) of about 4 mm and a diameter (A7) of about 2 mm, eight of the thirty-six indentations being used for receiving the eight dipole magnets (332), and an indentation having a depth (A3) of about 5 mm and a width (A2) of about 2 mm for receiving the four bar dipole magnets (331) disposed in the square-shaped arrangement. The distance (A9) between the centers of two indentations being disposed on two neighboring lines was about 3 mm. The distance (A10)

between the centers of two neighboring indentations being disposed on the diagonals of the supporting matrix (334) was about 4.2 mm.

The magnetic-field-generating device (340) was a bar dipole magnet having a length (B1) and a width (B2) of about 29.9 mm and a thickness (B3) of about 2 mm. The magnetic axis of the bar dipole magnet (340) was parallel to the substrate (310) surface. The bar dipole magnet (340) was made of NdFeB N30UH.

The magnetic-field-generating device (340) and the magnetic-field-generating device (330) were in direct contact, i.e. the distance (d) between the bottom surface of the magnetic-field-generating device (340) and the top surface of the magnetic-field-generating device (330) was about 0 mm (not shown true to scale in FIG. 3A for the clarity of the drawing). The magnetic-field-generating device (340) and the magnetic-field-generating device (330) were centered relative to each other, i.e. the midsection of the length (B1) and of the width (B2) of the magnetic-field-generating device (340) was aligned with the midsection of the length (A4) and of the width (A5) of the magnetic-field-generating device (330). The distance (h) between the top surface of the magnetic-field-generating device (340) and the surface of the substrate (310) facing the magnetic-field-generating device (340) was about 1.5 mm.

Magnetic Assembly (400-a, 400-b) (FIG. 4A-4B)

The magnetic-field-generating assembly (400-a, 400-b) (FIG. 4A-4B) comprised a magnetic-field-generating device (440) being disposed between a magnetic-field-generating device (430) and a substrate (410) carrying the coating composition (421, 421+422) comprising the non-spherical magnetic or magnetizable pigment particles as illustrated schematically in FIG. 4A. The magnetic-field-generating assembly (400-a, 400-b) further comprised a disc-shaped pole piece (450).

The magnetic-field-generating device (430) comprised four bar dipole magnets (431) disposed in a square-shaped arrangement, nineteen dipole magnets (432), eighteen dipole magnets (432) being disposed so as to form a double-row thick "V" and the nineteenth dipole magnet (432) being located at the tip of the "V", and a supporting matrix (434), as illustrated schematically in FIGS. 4A and 4B1.

As shown in FIGS. 4A and 4B, each of the four bar dipole magnets (431) disposed in the square-shaped arrangement had a length (A1) of about 25 mm, a width (A2) of about 2 mm and a thickness (A3) of about 5 mm. The four bar dipole magnets (431) disposed in the square-shaped arrangement were placed in such a way in the supporting matrix (434) that their magnetic axis was substantially parallel to the magnetic axis of the magnetic field-generating device (440) and substantially parallel to the substrate (410) surface, their North pole pointing radially towards the central area of the loop of said square-shaped arrangement, and their South pole pointing towards the exterior of the supporting matrix (434), i.e. pointing towards the environment. The center of the square formed by the four bar dipole magnets (431) disposed in a square-shaped arrangement coincided with the center of the supporting matrix (434). Each of the four bar dipole magnets (431) disposed in a square-shaped arrangement was made of NdFeB N48.

Each of the nineteen dipole magnets (432) disposed so as to form a double-row thick "V" and the nineteenth dipole magnet (432) being located at the tip of the "V", had a diameter (A7) of about 2 mm and a thickness (A8) of about 1 mm. The magnetic axis of each of the nineteen dipole magnets (432) was substantially perpendicular to the substrate (410) surface and to the magnetic axis of the magnetic-field-generating device (440) with its South Pole facing the magnetic-field-generating device (440). Each of the nineteenth dipole magnets (432) were made of NdFeB N48

The supporting matrix (434) had a length (A4) and a width (A5) of about 30 mm, and a thickness (A6) of about 6 mm. The supporting matrix (434) was made of POM. As shown in FIG. 4B1-2, the surface of the supporting matrix (434) comprised seventy-seven indentations, disposed in five lines comprising each nine indentations alternating with four lines comprising each eight indentations, having a depth (A8) of about 1 mm and a diameter (A7) of about 2 mm, nineteen of the seventy-seven indentations being used for receiving the nineteen dipole magnets (432), and an indentation having a depth (A3) of about 5 mm and a width (A2) of about 2 mm for receiving the square-shaped magnetic-field-generating device (431). The distance (A9) between the centers of two indentations being disposed on two neighboring lines along the length (A4) was about 4 mm. The distance (A10) between the centers of two indentations being disposed on a line parallel to the width (A5) was about 2.5 mm. The distance (A11) between the center of the first indentation on a nine-indentations line and the center of the first indentation on an eight-indentations line of the supporting matrix (434) was about 1.5 mm. The distances (A12) and (A13) between the center of the first nine-indentations line and the nearest bar dipole magnet (431) were about 1.5 mm.

The magnetic-field-generating device (440) was a bar dipole magnet having a length (B1) and a width (B2) of about 29.9 mm, and a thickness (B3) of about 2 mm. The magnetic axis of the bar dipole magnet (440) was parallel to the substrate (410) surface. The bar dipole magnet (440) was made of NdFeB N30UH.

The disc-shaped pole piece (450) had a diameter (C1) of about 30 mm and a thickness (C2) of about 2 mm. The disc-shaped pole piece (450) was made of steel S235.

The magnetic-field-generating device (440) and the magnetic-field-generating device (430) were in direct contact, i.e. the distance (d) between the bottom surface of the magnetic-field-generating device (440) and the top surface of the magnetic-field-generating device (430) was about 0 mm (not shown true to scale in FIG. 4A for the clarity of the drawing). The disc-shaped pole piece (450) was placed below the magnetic-field-generating device (430), such that the distance (e) between the bottom surface of the supporting matrix (434) of the magnetic-field-generating device (430) and the top surface of the disc-shaped pole piece was about 0 mm (not shown true to scale in FIG. 4A for the clarity of the drawing). The magnetic-field-generating device (440), the magnetic-field-generating device (430) and the disc-shaped pole piece (450) were centered relative to each other, i.e. the midsection of the length (B1) and of the width (B2) of the magnetic-field-generating device (440) was aligned with the midsection of the length (A4) and of the width (A5) of the magnetic-field-generating device (430) and with the diameter (C1) of the disc-shaped pole piece (450). The distance (h) between the top surface of the magnetic-field-generating device (440) and the surface of the substrate (410) facing the magnetic-field-generating device (440) was about 1.5 mm.

Magnetic Assembly (500-a, 500-b) (FIG. 5A-B)

The magnetic assembly (500) (FIG. 5A-B2) comprised a magnetic-field-generating device (530) being disposed between a magnetic-field-generating device (540) and a substrate (510) carrying the coating composition (521, 521+

522) comprising the non-spherical magnetic or magnetizable pigment particles as illustrated schematically in FIG. 5A.

The magnetic assembly (530) was the same as Example 6 disclosed in WO 2017/080698 A1 and comprised a ring-shaped dipole magnet (531), a loop-shaped pole piece (533) and a supporting matrix (534).

The ring-shaped dipole magnet (531) had an external diameter (L7) of about 26 mm, an internal diameter (L8) of about 16.5 mm and a thickness (L9) of about 2 mm. The ring-shaped dipole magnet (531) had a magnetic axis substantially perpendicular to the magnetic axis of the magnetic-field generating device (540) and substantially perpendicular to the substrate (510) surface, with the South pole facing the substrate (520). The ring-shaped dipole magnet (531) was made of NdFeB N40.

The loop-shaped pole piece (533) had an external diameter (L10) of about 14 mm, an internal diameter (L11) of about 10 mm and a thickness (L9) of about 2 mm. The loop-shaped pole piece (533) was centrally aligned with the loop-shaped magnetic-field generating device (531). The loop-shaped pole piece (533) was made of iron.

The supporting matrix (534) had a length (L4) of about 30 mm, a width (L5) of about 30 mm, and a thickness (L6) of about 3 mm. The supporting matrix (534) was made of POM. As shown in FIG. 5B2, the bottom surface of the supporting matrix (534) comprised two circular indentations having a depth (L9) of about 2 mm for receiving the ring-shaped dipole magnet (531) and the loop-shaped pole piece (533)

The ring-shaped magnetic-field generating device (531), the loop-shaped pole piece (533) and the supporting matrix (534) were centrally aligned along the length (L4) and the width (L5) of (534).

The magnetic-field generating device (540) comprised seven bar dipole magnets (541) and six spacer pieces (542). The seven bar dipole magnets (541) and the six spacer pieces (542) were disposed in an alternating non-symmetrical manner as shown in FIG. 5A, i.e. two bar dipole magnets (541) were in direct contact and adjacent to a spacer piece (542), the other five bar dipole magnets being each alternated with a spacer piece (542). The sixth spacer piece (542) was used to ensure the right positioning of the magnetic-field generating device (540) below the magnetic assembly (530). The seven bar dipole magnets (541) had each a length (L1) of about 30 mm, a width (L2a) of about 3 mm and a thickness (L3) of about 6 mm. Each of the six spacer pieces (542) had a length of about 20 mm, a width (L2b) of about 1.5 mm and a thickness (L3) of about 6 mm. The magnetic axis of each of the seven bar dipole magnets (541) was substantially parallel to the substrate (510) surface. The seven bar dipole magnets (541) were made of NdFeB N42. The six spacer pieces (542) were made of POM. The magnetic-field generating device (540) was the same as the magnetic-field generating device (240) (FIG. 2A), except that its magnetic direction is opposite to the magnetic direction of the magnetic-field generating device (540).

The magnetic-field-generating device (530) and the magnetic-field-generating device (540) were in direct contact, i.e. the distance (d) between the bottom surface of the magnetic-field-generating device (530) and the top surface of the magnetic-field-generating device (540) was about 0 mm (not shown true to scale in FIG. 5A for the clarity of the drawing). The distance (h) between the top surface of the magnetic-field-generating device (530) (i.e. the top surface of the supporting matrix (534) and the surface of the substrate (510) facing the magnetic-field-generating device (530) was about 3.5 mm.

Example E1 (FIG. 6A): Process Using the Magnetic Assembly Depicted in FIG. 2A-B as First Magnetic Assembly (200-a) and the Magnetic Assembly Depicted in FIG. 3A-B as Second Magnetic Assembly (300-b Example E1 was prepared according to the general process described hereabove using the magnetic assembly (200-a) (FIG. 2A-B) for the first orientations step (step b)), and the magnetic assembly (300-b) (FIG. 3A-B) for the second orientations step (step e)). The substrate (610) was disposed on the magnetic assembly (200-a) (FIG. 2A-B) used for the first orientation step and the magnetic assembly (300-b) (FIG. 3A-B) used for the second orientations step so that the magnetic direction of the magnetic-field-generating device (240) of the magnetic assembly (200-a) and the magnetic direction of the magnetic-field-generating device (340) of the magnetic assembly (300-b) were opposite relative to each other with reference to the substrate (610).

The resulting OEL (620) is shown in FIG. 6A at different viewing angles by tilting the substrate (610) between +20° and −60°. The resulting OEL (620) provides the visual impression of a circle reducing its size and being transformed into a square increasing its size and vice-versa upon titling the substrate (610), or in other words a circle being transformed upon shrinking into a growing square and vice-versa upon titling the substrate (610).

Example E2 (FIG. 6B): Process Using the Magnetic Assembly Depicted in FIG. 2A-B as First Magnetic Assembly (200-a) and the Magnetic Assembly Depicted in FIG. 4A-B as Second Magnetic Assembly (400-b Example E2 was prepared according to the general process described hereabove using the magnetic assembly (200-a) (FIG. 2A-B) for the first orientations step (step b)), and the magnetic assembly (400-b) (FIG. 4A-B) for the second orientations step (step e)). The substrate (610) was disposed on the magnetic assembly (200-a) (FIG. 2A-B) used for the first orientation step and the magnetic assembly (400-b) (FIG. 4A-B) used for the second orientations step so that the magnetic direction of the magnetic-field-generating device (240) of the magnetic assembly (200-a) and the magnetic direction of the magnetic-field-generating device (440) of the second magnetic assembly (400-b) were opposite to each other with reference to the substrate (610).

The resulting OEL (620) is shown in FIG. 6B at different viewing angles by tilting the substrate (610) between +20° and −60°. The resulting OEL (620) provides the visual impression of a circle reducing its size and being transformed into a triangle increasing its size and vice-versa upon titling the substrate (610), wherein both the circle and the triangle change their size upon titling the substrate (610), or in other words a circle being transformed upon shrinking into a growing triangle and vice-versa upon titling the substrate (610).

Example E3 (FIG. 6C): Process Using the Magnetic Assembly Depicted in FIG. 2A-B as First Magnetic Assembly (200-a) and the Magnetic Assembly Depicted in FIG. 4A-B as Second Magnetic Assembly (400-b Example E3 was prepared as the example E2, except that the second single pattern made of the second coating layer (622) (10 mm×10 mm) was smaller than first single pattern of a first coating layer (621) (16 mm×16 mm).

The resulting OEL (620) is shown in FIG. 6C at different viewing angles by tilting the substrate (610) between +20° and −60°. The resulting OEL (620) provides the visual impression of a circle reducing its size and being transformed into a triangle increasing its size and vice-versa upon titling the substrate (610), wherein both the circle and the triangle change their size upon titling the substrate (610), or in other words a circle being transformed upon shrinking into a growing triangle and vice-versa upon titling the substrate (610).

Figure 7:
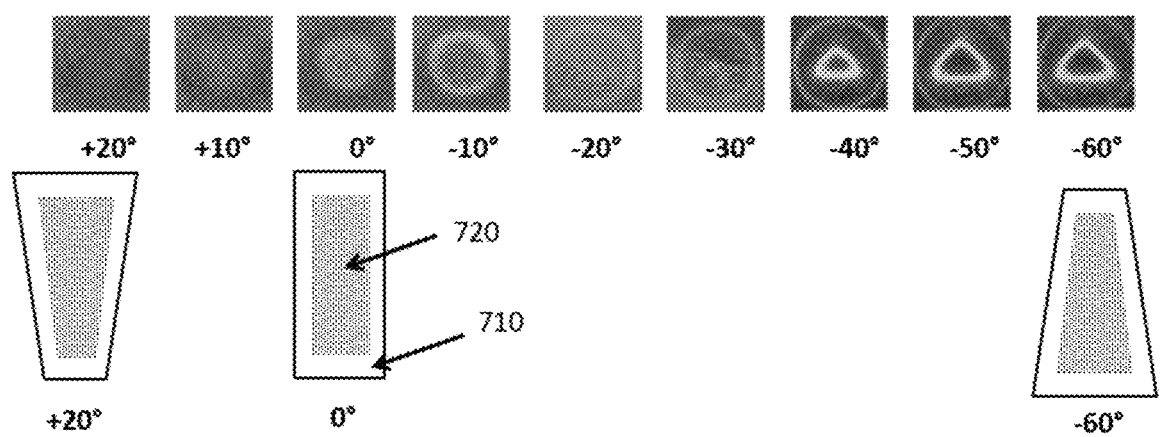
FIG. 7 show pictures of a comparative OEL as viewed under different viewing angles obtained by a process using the first magnetic assembly (500-a) depicted in FIG. 5A-B2 and the second magnetic assembly (400-b) depicted in FIG. 4A-B, wherein the magnetic direction of the magnetic-field generating device (540) used in the first orientation step is the same as the magnetic direction of the magnetic-field generating device (440) used in the second orientation step.

Comparative Example C1 (FIG. 7

Comparative Example C1 was prepared was prepared according to the general process described hereabove using a magnetic assembly (500-a) (FIG. 5A-B) and the magnetic assembly (400-b) (FIG. 4A-B) for the second orientations step (step e)). The substrate (710) was disposed on the magnetic assembly (500-a) (FIG. 5A-B) used for the first orientation step and the magnetic assembly (400-b) (FIG. 4A-B) used for the second orientations step so that the magnetic direction of the magnetic-field-generating device (540) of the first magnetic assembly (500-a) and the magnetic direction of the magnetic-field-generating device (440) of the second magnetic assembly (400-b) were the same with reference to the substrate (710).

The resulting comparative OEL (720) is shown in FIG. 7 at different viewing angles by tilting the substrate (710) between +20° and −60°. The resulting OEL (720) provides the visual impression of a circle with an inscribed triangle, wherein both the circle and the triangle increase their size (or alternatively decrease their size) upon titling the substrate (710), i.e. not an OEL providing an optical impression of a loop-shaped body having a size and a shape that varies upon tilting the optical effect layer.

The invention claimed is:

1. A process for producing an optical effect layer on a substrate, said process comprising the steps of:

a) applying on a substrate surface a first radiation curable coating composition comprising non-spherical magnetic or magnetizable pigment particles so as to form one or more first patterns of a first coating layer, said first radiation curable coating composition being in a first state, b) exposing the first radiation curable coating composition to a magnetic field of a first magnetic assembly comprising i) a first magnetic-field generating device comprising a loop-shaped magnetic-field generating device being either a single loop-shaped dipole magnet having a magnetic axis substantially perpendicular to the substrate surface or a combination of two or more dipole magnets disposed in a loop-shaped arrangement and having a resulting magnetic axis substantially perpendicular to the substrate surface, and ii) a second magnetic-field generating device being either a single bar dipole magnet having a magnetic axis substantially parallel to the substrate surface or a combination of two or more bar dipole magnets having a resulting magnetic axis substantially parallel to the substrate surface; or to a magnetic field of a first magnetic assembly comprising i) a first magnetic-field generating device comprising a supporting matrix, a loop-shaped magnetic-field generating device being either a single loop-shaped dipole magnet having a magnetic axis substantially perpendicular to the substrate surface or a combination of two or more dipole magnets disposed in a loop-shaped arrangement, each of the two or more dipole magnets having a magnetic axis substantially perpendicular to the substrate surface and having a same magnetic field direction, a single dipole magnet having a magnetic axis substantially perpendicular to the substrate surface or two or more dipole magnets having a magnetic axis substantially perpendicular to the substrate surface and having a same magnetic field direction and/or one or more pole pieces, and ii) a second magnetic-field generating device being either a single bar dipole magnet having a magnetic axis substantially parallel to the substrate surface or a combination of two or more bar dipole magnets, each of the two or more bar dipole magnets having a magnetic axis substantially parallel to the substrate surface and having a same magnetic field direction; or to a magnetic field of a first magnetic assembly comprising i) a first magnetic-field generating device comprising a supporting matrix, a loop-shaped magnetic-field generating device being either a single loop-shaped magnet or a combination of two or more dipole magnets disposed in a loop-shaped arrangement, the loop-shaped magnetic-field generating device having a radial magnetization, a single dipole magnet having a magnetic axis substantially perpendicular to the substrate surface, or a single dipole magnet having a magnetic axis substantially parallel to the substrate surface, or two or more dipole magnets, each of said two or more dipole magnets having a magnetic axis substantially perpendicular to the substrate surface, wherein the North pole of said single dipole magnet or the North pole of at least one of said two or more dipole magnets is pointing towards the substrate surface when the North pole of the single loop-shaped magnet or of the two or more dipole magnets forming the loop-shaped magnetic-field generating device is pointing towards the periphery of said loop-shaped magnetic-field generating device, or wherein the South pole of said single dipole magnet or the South pole of at least one of said two or more dipole magnets is pointing towards the substrate surface when the South pole of the single loop-shaped magnet or of the two or more dipole magnets forming the loop-shaped magnetic-field generating device is pointing towards the periphery of said loop-shaped magnetic-field generating device, and ii) a second magnetic-field generating device being either a single bar dipole magnet having a magnetic axis substantially parallel to the substrate surface or a combination of two or more bar dipole magnets, each of the two or more bar dipole magnets having a magnetic axis substantially parallel to the substrate surface and having a same magnetic field direction, so as to orient at least a part of the non-spherical magnetic or magnetizable pigment particles, and c) at least partially curing the first radiation curable coating composition of step b) to a second state so as to fix the non-spherical magnetic or magnetizable pigment particles in their adopted positions and orientations and so as to form one or more at least partially cured first patterns, d) applying at least partially on the one or more at least partially cured first patterns of step c) a second radiation curable coating composition comprising non-spherical magnetic or magnetizable pigment particles so as to form one or more second patterns of a second coating layer, said second radiation curable coating composition being in a first state, e) exposing the second radiation curable coating composition to a magnetic field of a second magnetic assembly, said second magnetic assembly being selected from the first magnetic assembly of step b), wherein said second magnetic assembly is different from the first magnetic assembly used in step b) and wherein the magnetic direction of the second magnetic-field generating device of said magnetic assembly is opposite to the magnetic direction of the second magnetic-field generating device of the first magnetic assembly within the reference frame of the substrate, and f) at least partially curing the second radiation curable coating composition of step e) to a second state so as to fix the non-spherical magnetic or magnetizable pigment particles in their adopted positions and orientations and so as to form one or more at least partially cured second patterns, wherein the optical effect layer provides an optical impression of a loop-shaped body having a size and a shape, that varies upon tilting the optical effect layer.

2. The process according to claim 1, wherein the non-spherical magnetic or magnetizable pigment particles are the same in the first radiation curable coating composition and in the second radiation curable coating composition or wherein the non-spherical magnetic or magnetizable pigment particles are different in terms of size and/or color properties in the first radiation curable coating composition and in the second radiation curable coating composition.

3. The process according to claim 1, wherein the non-spherical magnetic or magnetizable pigment particles are present in an amount from about 2 wt-% to about 40 wt-% in the first radiation curable coating composition and the non-spherical magnetic or magnetizable pigment particles are present in an amount from about 2 wt-% to about 40 wt-% in the second radiation curable coating composition.

4. The process according to claim 1, wherein the non-spherical magnetic or magnetizable pigment particles are present in about the same amount in the first radiation curable coating composition and in the second radiation curable coating composition.

5. The process according to claim 1, wherein c) is carried out partially simultaneously with the step b) and/or step f) is carried out partially simultaneously with the step e).

6. The process according to claim 1, wherein the non-spherical magnetic or magnetizable particles are platelet-shaped pigment particles, and wherein said process further comprises a step of exposing the radiation curable coating composition to a dynamic magnetic field of a magnetic-field-generating device so as to bi-axially orient at least a part of the platelet-shaped magnetic or magnetizable pigment particles, said step being carried out after step a) and before step b) and/or said step being carried out after step d) and before step e).

7. The process according to claim 1, wherein the shape of the one or more first patterns of the first coating layer and the shape of the one or more second patterns of the second coating layer independently represent one or more indicia, dots and/or lines.

8. The process according to claim 1, wherein the optical impression of the loop-shaped body varies between a first shape that is either a circular shape or a shape with at least one side and a second shape, which is a different shape with a different number of sides, upon tilting the optical effect layer.

9. The process according to claim 1, wherein the first magnetic assembly and/or the second magnetic assembly independently comprise i) the first magnetic-field generating device comprising a supporting matrix, the loop-shaped magnetic-field generating device being a single ring-shaped dipole magnet having a magnetic axis substantially perpendicular to the substrate surface and one or more pole pieces, and ii) the second magnetic-field generating device being two or more bar dipole magnets, each of the two or more bar dipole magnets having a magnetic axis substantially parallel to the substrate surface and having a same magnetic field direction; or ii) the first magnetic-field generating device comprising the supporting matrix, the loop-shaped magnetic-field generating device being a combination of four or more dipole magnets disposed in a loop-shaped arrangement, each of the four or more dipole magnets having a magnetic axis substantially parallel to the substrate surface and the loop-shaped magnetic-field generating device having a radial magnetization, and two or more dipole magnets having a magnetic axis substantially perpendicular to the substrate surface and having a same magnetic field direction, ii) the second magnetic-field generating device being a single bar dipole magnet having a magnetic axis substantially parallel to the substrate surface, wherein the North pole of at least one of said two or more dipole magnets is pointing towards the substrate surface when the North pole of the four or more dipole magnets forming the loop-shaped magnetic-field generating device is pointing towards the periphery of said loop-shaped magnetic-field generating device, or wherein the South pole of at least one of said two or more dipole magnets is pointing towards the substrate surface when the South pole of the four or more dipole magnets forming the loop-shaped magnetic-field generating device is pointing towards the periphery of said loop-shaped magnetic-field generating device; and iii) optionally one or more pole pieces.

10. The process according to claim 9, wherein the loop-shaped magnetic-field generating device of the first magnetic assembly is placed on top of either the single bar dipole magnet or the combination of two or more bar dipole magnets of said first magnetic assembly and wherein the loop-shaped magnetic-field generating device of the second magnetic assembly is placed on top of either the single bar dipole magnet or the combination of two or more bar dipole magnets of said second magnetic assembly.

11. The process according to claim 9, wherein the four or more dipole magnets of the loop-shaped magnetic-field generating are disposed in a square-shaped arrangement.

12. The process according to claim 1, wherein the first magnetic assembly comprises i) the first magnetic-field generating device comprising the supporting matrix, the loop-shaped magnetic-field generating device being a single ring-shaped dipole magnet having a magnetic axis substantially perpendicular to the substrate surface and one or more pole pieces, and ii) the second magnetic-field generating device being two or more bar dipole magnets, each of the two or more bar dipole magnets having a magnetic axis substantially parallel to the substrate surface and having a same magnetic field direction, and wherein the second magnetic assembly comprises i) the first magnetic-field generating device comprising the supporting matrix, the loop-shaped magnetic-field generating device being a combination of four or more dipole magnets disposed in a loop-shaped arrangement, each of the four or more dipole magnets having a magnetic axis substantially parallel to the substrate surface and the loop-shaped magnetic-field generating device having a radial magnetization, two or more dipole magnets having a magnetic axis substantially perpendicular to the substrate surface and having a same magnetic field direction, wherein the North pole of at least one of said two or more dipole magnets is pointing towards the substrate surface when the North pole of the four or more dipole magnets forming the loop-shaped magnetic-field generating device is pointing towards the periphery of said loop-shaped magnetic-field generating device, or wherein the South pole of at least one of said two or more dipole magnets is pointing towards the substrate surface when the South pole of the four or more dipole magnets forming the loop-shaped magnetic-field generating device is pointing towards the periphery of said loop-shaped magnetic-field generating device and ii) the second magnetic-field generating device being a single bar dipole magnet having a magnetic axis substantially parallel to the substrate surface, and iii) optionally one or more pole pieces.

13. The process according to claim 12, wherein the loop-shaped magnetic-field generating device of the first magnetic assembly is placed on top of either the single bar dipole magnet or the combination of two or more bar dipole magnets of said first magnetic assembly and wherein the loop-shaped magnetic-field generating device of the second magnetic assembly is placed on top of either the single bar dipole magnet or the combination of two or more bar dipole magnets of said second magnetic assembly.

14. The process according to claim 12, wherein the four or more dipole magnets of the loop-shaped magnetic-field generating are disposed in a square-shaped arrangement.

15. The process according to claim 1, wherein step a) and/or step d) is carried out by a printing process.

16. The process according to claim 15, wherein the printing process is selected from the group consisting of screen printing, rotogravure printing and flexography printing.

17. The process according to claim 1, wherein at least a part of the plurality of non-spherical magnetic or magnetizable particles is constituted by non-spherical optically variable magnetic or magnetizable pigment particles.

18. The process according to claim 17, wherein the non-spherical optically variable magnetic or magnetizable pigment particles are selected from the group consisting of magnetic thin-film interference pigments, magnetic cholesteric liquid crystal pigments and mixtures thereof.

* * * * *